(12) United States Patent
Young et al.

(10) Patent No.: US 8,590,515 B2
(45) Date of Patent: Nov. 26, 2013

(54) METHOD AND SYSTEM FOR POWERING AN OTTO CYCLE ENGINE USING GASOLINE AND COMPRESSED NATURAL GAS

(75) Inventors: Kimberley Allan Young, Saskatoon (CA); Quan Wan, Saskatoon (CA); Anton Robert Darcey Farber, Saskatoon (CA); Michael Theodore Sulatisky, Saskatoon (CA); Nathan Oliver Peter, Saskatoon (CA); Sheldon George Hill, Saskatoon (CA)

(73) Assignee: The Saskatchewan Research Council, Saskatoon (CA)

( * ) Notice: Subject to any disclaimer, the term of this patent is extended or adjusted under 35 U.S.C. 154(b) by 0 days.

(21) Appl. No.: 13/484,179

(22) Filed: May 30, 2012

(65) Prior Publication Data

US 2012/0304969 A1    Dec. 6, 2012

(30) Foreign Application Priority Data

Jun. 2, 2011    (CA) ..................................... 2742011

(51) Int. Cl.
*F02M 21/02*    (2006.01)

(52) U.S. Cl.
USPC ........ 123/525; 123/27 GE; 123/526; 123/575

(58) Field of Classification Search
USPC ...................... 123/27 GE, 525, 526, 527, 575
See application file for complete search history.

(56) References Cited

U.S. PATENT DOCUMENTS

| | | | | |
|---|---|---|---|---|
| 4,606,322 A | | 8/1986 | Reid et al. ...................... 123/575 |
| 4,641,625 A | * | 2/1987 | Smith ............................ 123/575 |
| 5,092,305 A | * | 3/1992 | King ............................. 123/575 |
| 5,228,423 A | * | 7/1993 | Oikawa et al. ................. 123/525 |
| 5,526,797 A | * | 6/1996 | Stokes ........................... 123/575 |
| 5,592,924 A | * | 1/1997 | Audisio et al. ................. 123/525 |
| 5,713,336 A | * | 2/1998 | King et al. ..................... 123/525 |
| 5,735,253 A | * | 4/1998 | Perotto et al. ............. 123/406.47 |
| 5,755,211 A | | 5/1998 | Koch ............................. 123/525 |

(Continued)

FOREIGN PATENT DOCUMENTS

EP          2 002 101      12/2008
WO      WO 2009/155684    12/2009

OTHER PUBLICATIONS

Notice of Allowance issued in Canadian patent application No. 2,742,011, dated Mar. 23, 2012.

(Continued)

*Primary Examiner* — Erick Solis
(74) *Attorney, Agent, or Firm* — Fulbright & Jaworski LLP

(57) ABSTRACT

Described are methods and systems for powering an Otto-cycle engine using gasoline and compressed natural gas (CNG). The Otto-cycle engine can be powered by determining a quantity of the gasoline and a quantity of the CNG to deliver to a cylinder of the engine during an engine cycle such that combustion within the cylinder occurs at a pre-determined air-fuel ratio; delivering the quantity of the gasoline to the cylinder via a gasoline injector and delivering the quantity of the CNG to the cylinder via a CNG injector such that the gasoline and the CNG combust during the same combustion event; and combusting the gasoline and the CNG within the cylinder. Delivering CNG and gasoline to the cylinder using separate injectors allows the quantities of CNG and gasoline to vary in response to engine operating conditions, which allows the fuel mixture to be adjusted to satisfy engine power and emissions criteria.

23 Claims, 11 Drawing Sheets

(56) References Cited

U.S. PATENT DOCUMENTS

| | | | |
|---|---|---|---|
| 5,816,224 A * | 10/1998 | Welsh et al. ................ 123/525 |
| 6,205,031 B1 | 3/2001 | Herzog et al. ............... 361/760 |
| 6,242,873 B1 | 6/2001 | Drozdz et al. ............... 318/139 |
| 6,289,881 B1 * | 9/2001 | Klopp .......................... 123/525 |
| 6,543,423 B2 | 4/2003 | Dobryden et al. ........... 123/480 |
| 6,679,221 B2 * | 1/2004 | Bassi et al. ................ 123/198 F |
| 6,687,597 B2 | 2/2004 | Sulatisky et al. ............ 701/104 |
| 6,845,608 B2 | 1/2005 | Klenk et al. ................... 60/274 |
| 6,879,054 B2 | 4/2005 | Gosselin ..................... 290/40 C |
| 6,909,200 B2 | 6/2005 | Bouchon ..................... 307/10.1 |
| 6,940,242 B1 | 9/2005 | Maslov et al. ............. 318/400.2 |
| 6,947,830 B1 | 9/2005 | Froloff et al. ................ 701/111 |
| 6,951,210 B2 * | 10/2005 | Landi et al. ................. 123/525 |
| 6,999,869 B1 | 2/2006 | Gitlin et al. .................. 701/115 |
| 7,019,626 B1 * | 3/2006 | Funk ............................ 340/438 |
| 7,021,409 B2 | 4/2006 | Tamor ....................... 180/65.25 |
| 7,121,234 B2 | 10/2006 | Schmitz et al. ............ 123/41.02 |
| 7,162,994 B2 | 1/2007 | Li et al. ........................ 123/299 |
| 7,200,487 B2 | 4/2007 | Ancimer ...................... 701/111 |
| 7,290,504 B2 | 11/2007 | Lange ............................ 123/1 A |
| 7,328,577 B2 | 2/2008 | Stewart et al. .............. 60/605.2 |
| 7,373,931 B2 | 5/2008 | Lennox et al. ............... 123/525 |
| 7,397,675 B2 | 7/2008 | Neacsu ........................... 363/41 |
| 7,415,389 B2 | 8/2008 | Stewart et al. ............... 702/185 |
| 7,469,177 B2 | 12/2008 | Samad et al. ................... 701/54 |
| 7,542,842 B2 | 6/2009 | Hill et al. ..................... 701/105 |
| 7,560,895 B2 | 7/2009 | Arnet ........................... 318/778 |
| 7,577,006 B2 | 8/2009 | Neacsu ........................... 363/71 |
| 7,593,807 B2 | 9/2009 | Fattic ........................... 701/105 |
| 7,627,416 B2 | 12/2009 | Batenburg et al. ........... 701/103 |
| 7,640,084 B2 | 12/2009 | Musser .......................... 701/22 |
| 7,647,916 B2 * | 1/2010 | Leone et al. ................. 123/432 |
| 7,703,435 B2 | 4/2010 | Surnilla et al. ............... 123/304 |
| 7,712,451 B2 | 5/2010 | Hung et al. ................... 123/431 |
| 7,721,703 B2 * | 5/2010 | Kakuho et al. ............... 123/304 |
| 7,728,448 B2 | 6/2010 | Bouchon et al. ............ 290/40 C |
| 7,741,798 B2 | 6/2010 | Lucas ....................... 318/400.24 |
| 7,753,150 B2 | 7/2010 | Tamor ...................... 180/65.265 |
| 7,832,381 B2 * | 11/2010 | Pott et al. ..................... 123/525 |
| 7,905,219 B2 * | 3/2011 | Kronenberg et al. ......... 123/549 |
| 2002/0195088 A1 * | 12/2002 | Oprea ........................... 123/525 |
| 2003/0192513 A1 * | 10/2003 | Nist .............................. 123/525 |
| 2004/0139944 A1 | 7/2004 | Nakano et al. ........... 123/406.47 |
| 2004/0250797 A1 * | 12/2004 | Shetley ........................ 123/525 |
| 2010/0077845 A1 | 4/2010 | Pattantyus et al. ......... 73/114.67 |
| 2010/0147262 A1 | 6/2010 | Martin et al. ................. 123/299 |

OTHER PUBLICATIONS

International Search Report and Written Opinion issued in PCT Application No. PCT/CA2012/000528, dated Sep. 7, 2012.

\* cited by examiner

METHOD AND SYSTEM FOR POWERING AN OTTO CYCLE ENGINE USING GASOLINE AND COMPRESSED NATURAL GAS

CROSS-REFERENCE TO RELATED APPLICATIONS

The present application claims priority to Canadian Patent Application Number CA 2,742,011, filed Jun. 2, 2011. The contents of the referenced application are incorporated into the present application by reference.

TECHNICAL FIELD

The present disclosure is directed at a method and system for powering an Otto cycle engine using gasoline and an alternative fuel. More particularly, the present disclosure is directed at a method and system for powering the Otto cycle engine using gasoline and compressed natural gas in which the gasoline and the compressed natural gas are stored separately, but can be combusted simultaneously.

BACKGROUND

Given increasing environmental awareness with respect to the role greenhouse gases play in contributing to global warming and given gasoline prices that are forecast to continue to increase, the use of alternative (i.e.: non-gasoline) fuels to power motor vehicles is becoming more prevalent. Alternative fuels include, for example, compressed natural gas and hydrogen gas. These alternative fuels are advantageous over gasoline in that they are often cheaper than gasoline, can be obtained from more politically friendly and secure sources around the world than crude oil, are cleaner burning than gasoline, and emit fewer or less harmful greenhouse gases than gasoline. There accordingly exists continuing research and development in the field of using these alternative fuels to power motor vehicles.

SUMMARY

According to a first aspect, there is provided a method for powering an Otto-cycle engine using gasoline and compressed natural gas (CNG). The method includes determining a quantity of the gasoline and a quantity of the CNG to deliver to a cylinder of the engine during an engine cycle such that combustion within the cylinder occurs at a predetermined air-fuel ratio; delivering the quantity of the gasoline into the cylinder via a gasoline injector and delivering the quantity of the CNG into the cylinder via an alternative fuel injector such that the gasoline and the CNG combust during the same combustion event; and combusting the gasoline and the CNG within the cylinder during the same combustion event. The predetermined air-fuel ratio can be selected such that combustion within the cylinder occurs at stoichiometry. Determining the quantity of the gasoline and the quantity of the CNG can include determining a stock quantity of the gasoline to deliver to the cylinder such that combustion occurs within the cylinder at stoichiometry when the engine is powered solely using the gasoline; determining a portion of the stock quantity of the gasoline to substitute with the CNG, wherein the remaining stock quantity of gasoline following substitution is the quantity of the gasoline to deliver to the cylinder; and determining the quantity of the CNG to deliver to the cylinder from the portion of the stock quantity of gasoline to substitute with the CNG such that combustion of the gasoline and the CNG within the cylinder occurs at stoichiometry.

Determining the stock quantity of the gasoline can include intercepting an injection signal, sent to the gasoline injector from a powertrain control module that is configured to power the engine solely using the gasoline, instructing the gasoline injector to deliver the stock quantity of the gasoline into the cylinder. Intercepting the injection signal can include simulating operation of the gasoline injector such that the powertrain control module is unaware that the injection signal has been intercepted.

The injection signal can be intercepted by an electronic control unit communicatively coupled to the powertrain control module. The gasoline injector can be solely actuated by the electronic control unit regardless of whether any of the stock quantity of gasoline is substituted with the CNG.

Intercepting the injection signal can also include determining whether the injection signal comprises an asynchronous pulse, wherein the asynchronous pulse comprises any pulse sent to the cylinder during a period starting when the cylinder fired during an immediately preceding firing cycle of the engine and continuing until a certain number of other cylinders in the engine has fired at most once each; and when the injection signal comprises the asynchronous pulse: (i) determining whether the gasoline injector is currently injecting gasoline or whether the powertrain control module has previously sent a synchronous pulse that will cause, but has not yet caused, the gasoline injector to inject gasoline; and (ii) when the gasoline injector is not currently injecting gasoline and the powertrain control module has not previously sent a synchronous pulse that will cause, but has not yet caused, the gasoline injector to inject gasoline, sending the asynchronous pulse to the gasoline injector.

Intercepting the injection signal may include determining whether the injection signal includes an asynchronous pulse. An asynchronous pulse may be any pulse sent to the cylinder during a period starting when the cylinder fired during an immediately preceding firing cycle of the engine and continuing until a certain number of other cylinders in the engine has fired at most once each. And, when the injection signal does include the asynchronous pulse, intercepting the injection signal may also include determining whether the gasoline injector is currently injecting gasoline or whether the powertrain control module has previously sent a synchronous pulse that will cause, but has not yet caused, the gasoline injector to inject gasoline; and when the gasoline injector is not currently injecting gasoline and the powertrain control module has not previously sent a synchronous pulse that will cause, but has not yet caused, the gasoline injector to inject gasoline, sending the asynchronous pulse to the gasoline injector.

When the injection signal includes the asynchronous pulse, the asynchronous pulse may be blocked when the gasoline injector is currently injecting gasoline or when the powertrain control module has previously sent a synchronous pulse that will cause, but has not yet caused, the gasoline injector to inject gasoline.

The quantity of the CNG may vary with engine load. For example, the quantity of the CNG may decrease as the engine load increases.

Determining the quantity of the gasoline and the quantity of the CNG can include determining whether engine load is less than a low load threshold, and using none of the gasoline to fuel the engine when the engine load is less than the low load threshold; and determining whether engine load exceeds a high load threshold, and using none of the CNG to fuel the engine when the engine load exceeds the high load threshold.

The quantity of the CNG may vary with engine speed. For example, the quantity of the CNG may decrease as the engine speed increases.

Determining the quantity of the gasoline and the quantity of the CNG may include determining whether engine speed is less than a low speed threshold, and using none of the gasoline to fuel the engine when the engine speed is less than the low speed threshold; and determining whether engine speed exceeds a high speed threshold, and using none of the CNG to fuel the engine when the engine speed exceeds the high load threshold.

Any of the foregoing aspects of the method may also include determining whether pressure in a tank containing the CNG exceeds a high tank pressure threshold and whether pressure at the alternative fuel injector exceeds a high injection pressure threshold, and delivering none of the CNG to the cylinder unless the pressure in the tank and the pressure at the alternative fuel injector exceed the high tank pressure threshold and the high injection pressure threshold, respectively. Additionally, the method may also include determining whether the pressure in the tank containing the CNG is below a low tank pressure threshold and whether the pressure at the alternative fuel injector is below a low injection pressure threshold, and delivering exclusively the gasoline to the cylinder when the pressure in the tank and the pressure at the alternative fuel injector are both below the low tank pressure threshold and the low injection pressure threshold, respectively.

The gasoline may be delivered to the cylinder a gasoline injection delay after interception of the injection signal, and the CNG may be delivered to the cylinder an alternative fuel injection delay after interception of the injection signal.

Any of the foregoing aspects of the method may include determining whether the quantity of the gasoline to be delivered is less than a minimum amount of gasoline that the gasoline injector is able to inject, and if so fuelling the engine exclusively with the CNG.

Any of the foregoing aspects of the method may also include determining whether the quantity of the CNG to be injected is less than a minimum amount of alternative fuel that the alternative fuel injector is able to inject, and if so fuelling the engine exclusively with the gasoline.

The combustion event in any of the foregoing aspects of the method that combusts both the CNG and the gasoline can occur later than a combustion event that is used to combust exclusively gasoline.

In any of the foregoing aspects, the quantity of the gasoline and the quantity of the CNG can each be determined using a pressure differential across the gasoline injector comprising a difference between measured manifold air pressure and gasoline fuel injection pressure.

According to another aspect, there is provided a system for powering an Otto-cycle engine using gasoline and CNG. The system includes a processor and a memory, communicatively coupled to the processor, and having encoded thereon statements and instructions to cause the processor to execute any of the foregoing aspects of the method or any suitable combinations thereof. The system may also include a powertrain control module configured to power the engine solely using the gasoline and an electronic control unit comprising the processor and communicatively coupled to the engine and to the powertrain control module. For example, in one aspect, the system may include a single electronic control unit that controls the engine without intercepting signals, while in another aspect the system may include the powertrain control module and the electronic control unit may intercept the signals sent to the engine from the powertrain control module and thereby directly actuate the injectors in the engine.

According to another aspect, there is provided a non-transitory computer readable medium having encoded thereon statements and instructions to cause a processor to execute any of the foregoing aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Figure 1:
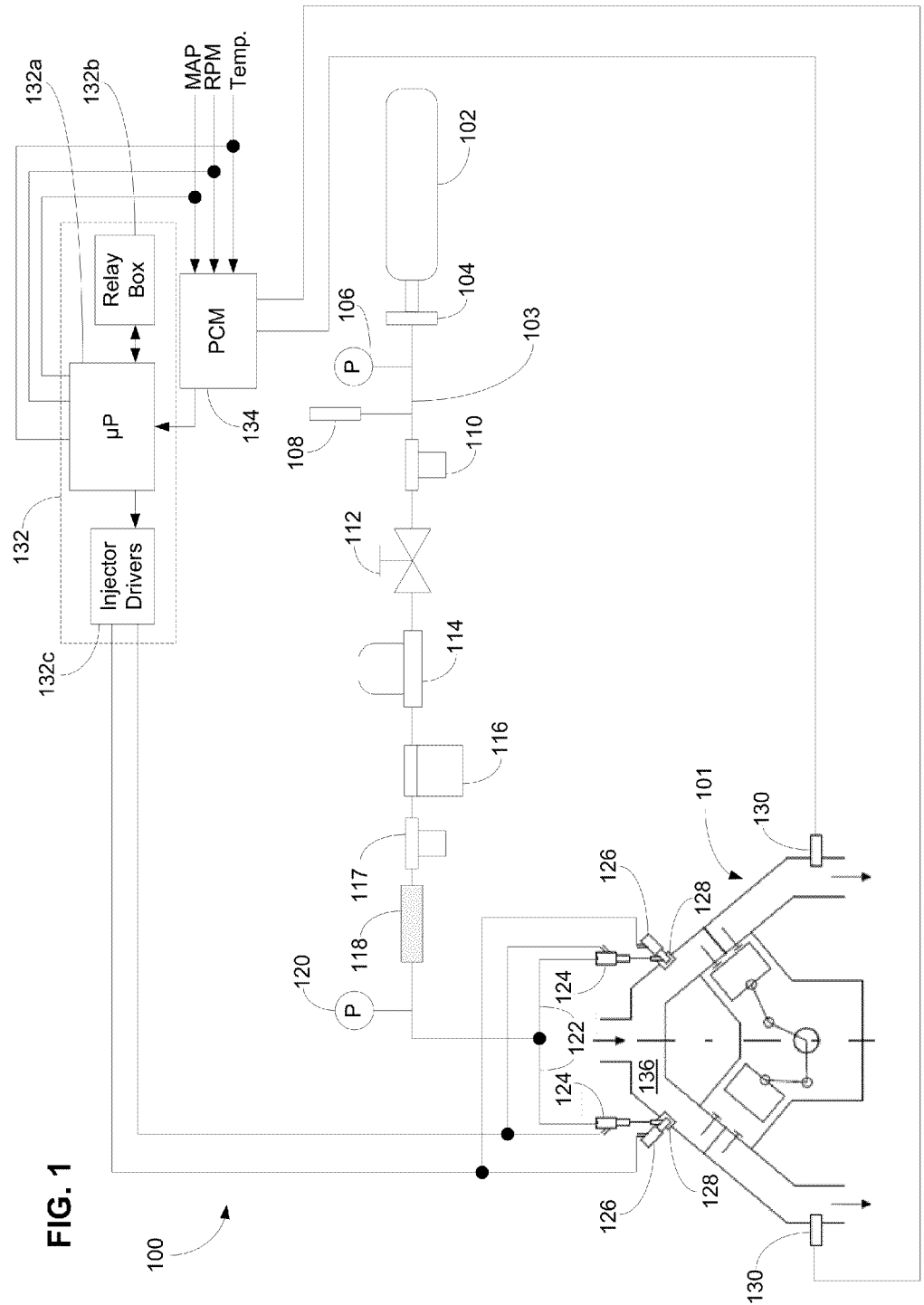
FIG. 1 is a schematic of a system for powering an Otto cycle engine using gasoline and compressed natural gas, according to one embodiment in which a system that is initially configured to operate the engine using only gasoline is retrofitted to operate the engine using both gasoline and the compressed natural gas.

Directional terms such as "top", "bottom", "upwards", "downwards", "vertically" and "laterally" are used in the following description for the purpose of providing relative reference only, and are not intended to suggest any limitations on how any apparatus is to be positioned during use, or to be mounted in an assembly or relative to an environment.

Research and development is ongoing in the field of powering motor vehicles using, at least in part, alternative (non-gasoline) fuel sources. Two exemplary types of motor vehicles that have been developed and that can use alternative fuels for energy are known as "flex-fuel" vehicles and "bi-fuel" vehicles.

In the context of an Otto cycle motor vehicle, a "flex-fuel" vehicle is a vehicle that has been configured to burn a blended mixture of gasoline and an alternative fuel. Both fuels are blended and stored in the same tank. For example, the flex-fuel vehicle may burn a blend of gasoline and ethanol, or a blend of gasoline and methanol. One disadvantage associated with flex-fuel vehicles, however, is that the choice of which fuels to blend is practically limited. Another disadvantage associated with flex-fuel vehicles is that because the gasoline and the alternative fuel are blended together in the fuel tank, the ratio of gasoline to the alternative fuel is constant and cannot be varied in response to changing driving conditions. This is potentially detrimental when driving on a particularly steep incline, for example, and including more gasoline in the fuel blend would increase engine power.

Also in the context of an Otto cycle motor vehicle, a bi-fuel vehicle is a vehicle that has been configured to run on either gasoline or an alternative fuel, but not both at the same time. The gasoline and the alternative fuel are stored in separate tanks. For example, a bi-fuel vehicle may run on gasoline and compressed natural gas (CNG) or on gasoline and hydrogen, depending on the operator's preference. The gasoline is stored in one tank, and the CNG or the hydrogen is stored in a different, pressurized tank. The operator can select which fuel to burn by toggling a fuel selection switch. As with flex-fuel vehicles, however, the operator has very limited ability to control the ratio of fuel that reaches the vehicle's engine. The operator can only have the engine run on 100% gasoline or 100% of the alternative fuel, and nothing in between.

There accordingly exists a need for a motor vehicle that allows operators to fuel their engines using any suitable proportion of gasoline and an alternative fuel, depending on the performance criteria demanded of the vehicle by, for example, driving conditions or environmental regulations. The embodiments disclosed herein are directed at a method and system that can be used to configure a motor vehicle to run on both gasoline and an alternative fuel simultaneously and in varying proportions, as desired. In particular, the alternative fuel primarily discussed in relation to the exemplary embodiments is CNG. One embodiment (the "retrofit embodiment") is directed at a method and system that involve modifying a vehicle that runs on a gasoline powered, Otto cycle engine by adding alternative fuel injectors to the engine, and by adding an electronic control unit to the vehicle's powertrain control module to control both gasoline fuel injectors that are present in the unmodified vehicle and the alternative fuel injectors. The electronic control unit is able to vary how much of the gasoline and how much of the CNG is combusted during each combustion event (e.g. fuel combustion initiated by a spark plug) of the gasoline engine. Another embodiment (the "OEM embodiment") is directed at a method and system in which the vehicle is manufactured with both the gasoline and the alternative fuel injectors, and in which the powertrain control module is suitably configured to control both sets of injectors without the electronic control unit. As discussed in further detail below, the following embodiments inject into an engine, gasoline alone, the CNG alone, or gasoline combined with the CNG in proportions tuned to deliver any of relatively good emissions control, power output, and fuel economy.

Exemplary Retrofit Embodiment

Referring now to FIG. 1, there is shown one embodiment of a system 100 for powering a gasoline engine using both gasoline and CNG. The gasoline is stored in a gasoline tank (not shown). The CNG is stored in a pressurized tank 102 capped at one end by a tank valve 104 through which a CNG conduit 103 is inserted into the tank 102. The CNG conduit 103 couples the tank 102 to an Otto-cycle engine 101 that is configured to burn both the CNG and gasoline. In addition to having gasoline injectors 126 that are fluidly coupled to the gasoline tank and used to inject gasoline into the engine 101's intake manifold 136, the engine 101 is also configured with alternative fuel injectors 124 that are positioned to inject the CNG into the intake manifold either separately from or simultaneously with injection of gasoline by the gasoline injectors 126. The gasoline and the CNG are delivered to the engine 101's cylinders via the injectors 126, 124 and the intake manifold 136. The alternative fuel injectors 124 are located along natural gas injector rails 122 that supply the alternative fuel injectors 124 with the CNG from the tank 102. Each of the injectors 124, 126 is paired with an injector adapter receptacle 128 that is used to attach the alternative fuel injectors 124 to the intake manifold 136, and that facilitates injection of the CNG into the intake manifold 136 past the gasoline injectors 126. Oxygen sensors 130 is positioned along the exhaust conduit of the engine 101 so as to analyze the amount of oxygen present in the engine 101's combustion products.

Figure 2:
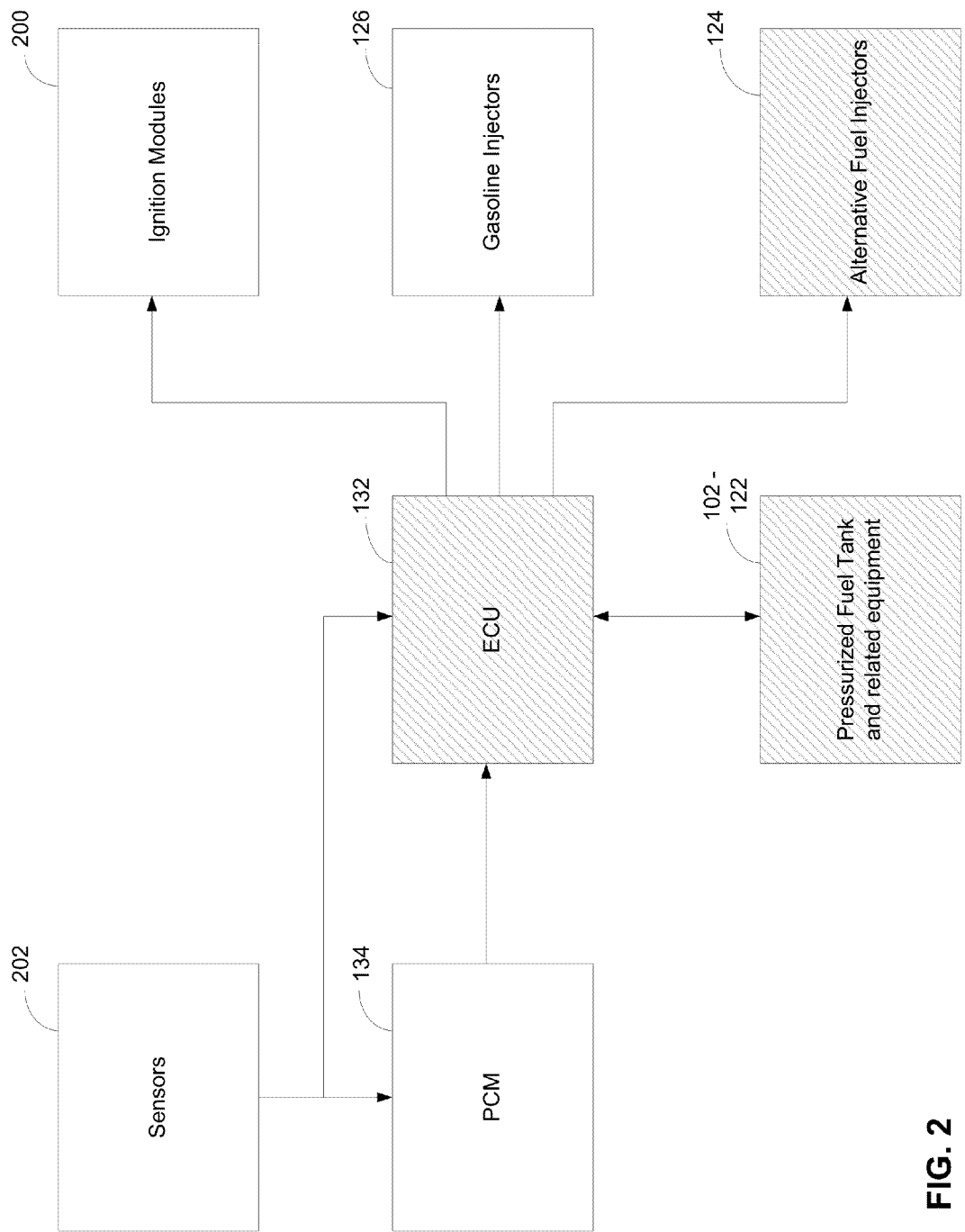
FIG. 2 is a block diagram illustrating how an electronic control unit, which forms part of the system of FIG. 1, is communicatively coupled to various other components of the system of FIG. 1.

The system 100 includes a powertrain control module ("PCM") 134 and an electronic control unit ("ECU") 132 that collectively control when and how much gasoline and CNG are injected into the intake manifold of the engine 101. The ECU 132 includes a microprocessor 132a that is communicatively coupled to the PCM 134 and injector drivers 132c and a relay box 132b, as discussed in further detail below. In the embodiment of the system 100 shown in FIG. 1, the motor vehicle was initially powered solely using gasoline and has been retrofitted to be powered using both gasoline and CNG. In the present embodiment, the motor vehicle is a 2008 GMC™ Truck 1500 4WD Yukon™ Hybrid; however, in alternative embodiments, any suitable motor vehicle that has a gasoline engine may be modified. Prior to any retrofitting, the engine 101 is outfitted without any of the alternative fuel injectors 124 and is connected solely to the PCM 134. The PCM 134 is configured to command the gasoline injectors 126 to inject gasoline into the intake manifold, and to power the engine 101 solely using gasoline. During retrofitting, the alternative fuel injectors 124 and the natural gas injector rails 122 are added (along with related components of the system 100, such as the tank 102 and the tank valve 104, that are used to deliver CNG to the intake manifold), and the ECU 132 is connected between the PCM 134 and the gasoline and alternative fuel injectors 126, 124. The ECU 132 intercepts signals that the PCM 134 sends to the gasoline injectors 124. According to a method discussed in more detail with respect to FIG. 6, below, the ECU 132 uses the intercepted signals and data acquired using various sensors to determine how much of each of gasoline and CNG to inject into the engine 101, and then, via the injector drivers 132c, accordingly commands both the gasoline and alternative fuel injectors 126, 124 to inject gasoline and CNG into the intake manifold. This is depicted schematically in FIG. 2. In FIG. 2, the PCM 134 and the ECU 132 receive input from various sensors 202 located throughout the system 100. The sensors 202 include the oxygen sensors 130, and sensors delivering information relating to the manifold air pressure (MAP), engine speed, and temperature. Instead of being directly coupled to the alternative fuel and gasoline injectors 126, 124, the PCM 134 outputs signals only to the ECU 132. The ECU 132 then determines what signals to send to both the alternative and gasoline fuel injectors 126, 124, spark ignition modules 200 (e.g.: spark plugs), and various other components used to control and regulate the flow of CNG from the tank 102 to the alternative fuel injectors 124.

Various other components are also added during retrofitting of the engine 101. Listed in order from the tank valve 104 to the natural gas injector rails 122 are a tank pressure transducer 106 used to monitor pressure in the tank 102; a fill probe 108 used to interface with a fuel dispenser (not shown) in order to fill the tank 102; a high pressure filter 110 to remove impurities from the CNG; a valve 112 to manually shut off and turn on the CNG flow from the tank 102; a solenoid valve 114, that is controlled by the ECU 132 via the relay box 132b, to automatically shut off and turn on the CNG flow from the tank 102; a CNG pressure regulator 116 to regulate the pressure of the CNG within the CNG conduit 103; a low pressure filter 117; various hoses and clamps 118; and an injector pressure transducer 120, which measures the pressure of the CNG in the natural gas injector rails 122. Although not shown in FIG. 1, the ECU 132 is also electrically coupled to spark plugs in the engine 101, and can accordingly initiate combustion events within the engine 101 by triggering the spark plugs.

An exemplary list of components that can be used to manufacture the system 100 depicted in FIG. 1 follows:

TABLE 1

Exemplary Components Used to Manufacture the System 100

| Reference Numeral | Number of Components | Component Description | Supplier | Part Number |
|---|---|---|---|---|
| 102 | 2 | 68-L Cylinders 250 bar | Dynetek ™ | Q068NGV250G5-NGV2 |
|  | 2 | 350-bar Closed End Plug, 1.125 in thread | Dynetek ™ | EP-C-350-5-01 |
|  | 4 | Angle Bracket Assembly 250 bar | Dynetek ™ | BA-Q-01-0 1 |
|  | 1 | Packing Crate Labels | Dynetek ™ |  |
| 104 | 2 | Vented Valve Kit | ECO Fuel Systems ™ | V-T1-100 GFI Vented Valve-LUM Cyl |
|  | 1 | Brass Nut, ⅜ inch | ECO Fuel Systems ™ | F-39-8 |
|  | 1 | Vent Flange | ECO Fuel Systems ™ | O-B-14 |
|  | 1 | Flare 3000 psi | ECO Fuel Systems ™ | V-CTI-CG9 CG-9 PRD W/ ½ inch |
|  | 1 | Venting Hose | ECO Fuel Systems ™ | H-G946-125 1 ¼ inch |
| 108 | 1 | Fill Probe Sherex NGV1 REC. (No Bulkhead) | ECO Fuel Systems ™ | V-SH-LB30-P30 |
|  | 1 | Tube Bulkhead, SAE x ¼ inch | ECO Fuel Systems ™ | F-SS-400-11-6ST |
| 110 | 1 | High Pressure Filter, 15 micron | Swagelok ™ | SS-6TF-15 |
| 112 | 1 | Multi-turn Valve, 3000 psi | IMPCO ™ | HRR-303 |
| 114 | 1 | Solenoid Valve, 3600 psi | TeleflexGFI ™ | 1731X2 HC00158 |
| 116 | 1 | CNG Pressure Regulator., 30 MPa | Max-Quip ™ | Prins/Keihin, single stage |
| 118 | 1 | Flexible Hoses & Clamps, LPG-CNG hose 11 & 16 mm | Max-Quip ™ | PRIN 081/24003 & PRIN 081/25001 |
| 120 | 1 | Pressure Transducer, Injectors | Digi-Key ™ (Measurement Specialties) | MSP3101P2-ND, 0 to 250 psi (MSP300) |
| 122 | 2 | Natural Gas Injector Rail, 4-cylinder, 73 cc/yellow | Max-Quip ™ | PRIN 180/30440/Keihin DM4-2 |
| 126 | 8 | Gasoline Injectors |  |  |
| 128 | 8 | Injector Adapter Receptacles - GM 08 | ECO Fuel Systems ™ | A-EDI-AD-GM08 |
| 130 | 2 | Oxygen Sensors |  |  |
| 132a | 1 | Microprocessor, 32-bit | Freescale ™ | MPC5554BLK |
| 106 | 1 | Pressure Transducer Tank, 0 to 5000 psi | Digi-Key ™ (Measurement Specialities) | 223-1017-ND (M5100) |

Figure 3A:
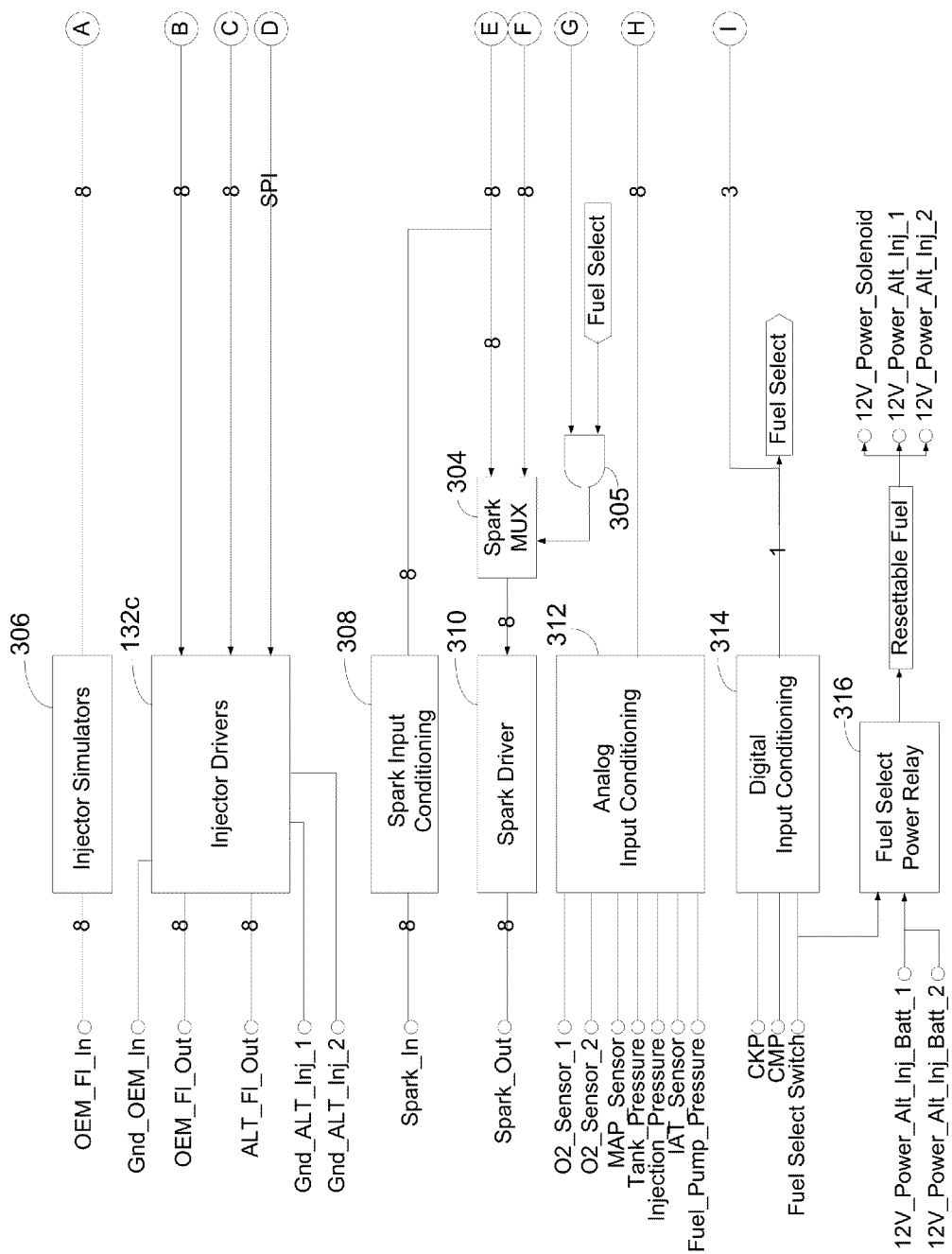
FIGS. 3(a) and (b) are block diagrams illustrating the electronic control unit of FIG. 2.
Figure 3B:
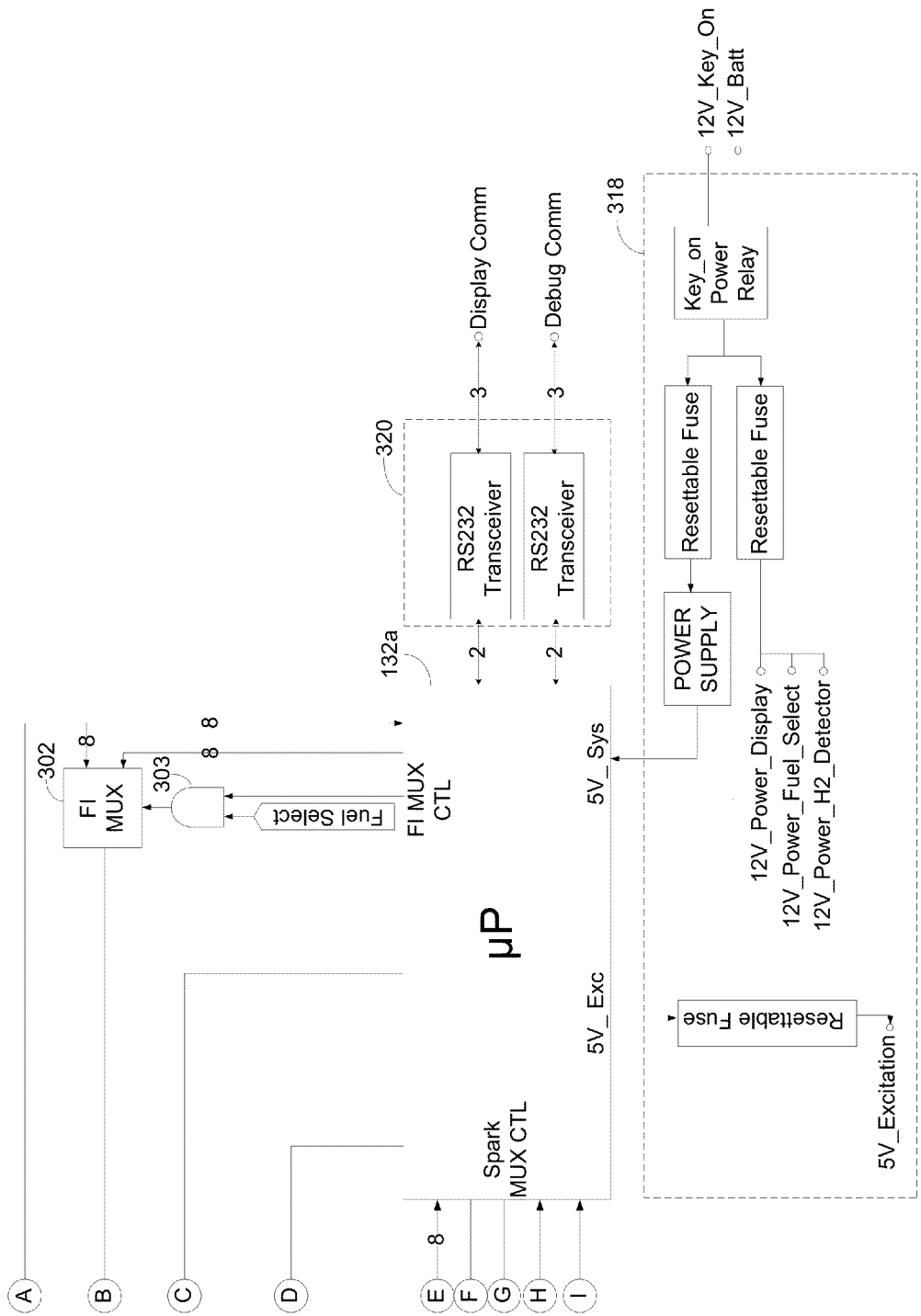

Referring now to FIGS. 3(*a*) and (*b*), there is shown a block diagram of the ECU 132. Central to the ECU 132 is the microprocessor 132*a* that is configured to intercept signals from the PCM 134 and to output signals to the gasoline and alternative fuel injectors 126, 124 and to the spark ignition modules 200. The microprocessor 132*a* may be, for example, an MPC5554 32-bit embedded controller from Freescale Semiconductor™'s MPC55xx family of processors designed for engine management. The microprocessor 132*a* is coupled to debug circuitry 320 in the form of two RS232 transceivers that can be used to communicate with the microprocessor 132*a* during debugging procedures, and is powered via power supply circuitry 318 in the form of a power relay, resettable fuses, and a power supply.

The signals that the PCM 134 sends to the gasoline injectors 126 (OEM_FI_IN) are intercepted via injector simulators 306. The injector simulators 306 simulate operation of the gasoline injectors 126 used in a conventional gasoline engine such that the presence of the ECU 132 does not cause the PCM 134 to conclude that there has been a malfunction in the gasoline injectors 126 and such that the PCM 134 is unaware that the OEM_FI_IN signal has been intercepted. The injector simulators 306 also allow the pulse width of the OEM_FI_IN signal to be measured such that the pulse width information can be used by the microprocessor 132*a*. Similarly, the signals that the PCM 134 sends to the spark ignition modules 200

(SPARK_IN) are intercepted via spark input conditioning circuitry 308 and are then conveyed to the microprocessor 132a for analysis; the spark input conditioning circuitry 308 may be, for example, a 74AC541 CMOS non-inverting tri-state bus buffer.

In order to determine how to modify the OEM_FI_IN and SPARK_IN signals, the microprocessor 132a also utilizes data from the various sensors 202 located throughout the system 100. Analog data sent to the microprocessor 132a from these sensors 202 includes data from the oxygen sensors 130 (O2_SENSOR_1 and O2_SENSOR_2) regarding how much oxygen is present in the engine 101's combustion products; data describing manifold air pressure (MAP_Sensor) that is proportional to engine load; data from the engine coolant temperature (ECT_Sensor); CNG pressure data from the tank pressure transducer 106 (Tank_Pressure); CNG pressure data from the injector pressure transducer 120 (Injection_Pressure); data concerning intake air temperature (IAT_Sensor); and pressure data from a fuel pump used to pump the gasoline from the gasoline tank (Fuel_Pump_Pressure). This analog data is conditioned using analog input conditioning circuitry 312 prior to being sent to the microprocessor 132a; the analog conditioning circuitry 312 may be, for example, a TLV2374 single supply rail-to-rail operational amplifier.

Digital data sent to the microprocessor 132a includes crankshaft position (CKP); camshaft position (CMP); and a signal from the fuel selection switch indicating whether the operator wants to operate only on gasoline or wants to operate in multiple fuels mode using both gasoline and CNG (Fuel Select). This digital data is conditioned using digital input conditioning circuitry 314 prior to being sent to the microprocessor 132a; the digital input conditioning circuitry 314 may be, for example, a CD4050B CMOS non-inverting buffer. The Fuel Select signal is also used to trigger a fuel select power relay 316, which may be contained within the relay box 132b, that opens and closes the solenoid valve 114, thereby starting and stopping CNG flow through the CNG conduit 103, and that powers the alternative fuel injectors 124.

Via the injector drivers 132c, the ECU 132 outputs to the alternative fuel and gasoline injectors 126, 124 OEM_FI_OUT and ALT_FI_OUT signals, respectively, that determine how much and when the alternative fuel and gasoline injectors 126, 124 inject fuel into the intake manifold. When the Fuel Select signal is low, which indicates that the operator wishes to run the engine 101 solely using gasoline, the output of an and gate 303 is driven low and an injector multiplexer 302 whose selection input is coupled to the output of the and gate 303 consequently redirects the OEM_FI_IN signal directly to the injector drivers 132c. The injector drivers 132 in turn send it to the gasoline injectors 124 as the OEM_FI_OUT signal. When the engine 101 runs solely on gasoline, the microprocessor 132a always holds the ALT_FI_OUT signal low, indicating that the alternative fuel injectors 124 are to remain dormant.

When the Fuel Select signal is high, which indicates that the operator wishes to run the engine 101 using both gasoline and CNG, the output of the and gate 303 will be determined by the FIMUX CTL signal output from the microprocessor 132a. When the FIMUX CTL signal is high, the OEM_FI_OUT signal will correspond to a signal determined and output by the microprocessor 132a; when the FIMUX CTL signal is low, the OEM_FI_OUT signal will correspond to the OEM_FI_IN signal.

Via spark drivers 310, the ECU 132 also outputs the signals that are used to ignite the engine 101's spark plugs; the spark drivers 310 may be, for example, a 74AC541 CMOS non-inverting tri-state bus buffer. When the Fuel Select signal is low, which indicates that the operator wishes to run the engine 101 solely using gasoline, the output of an and gate 305 is driven low and a spark multiplexer 304 whose selection input is coupled to the output of the and gate 305 consequently redirects the SPARK_IN signal directly to the spark driver 310. The spark driver 310 in turn sends it to the spark injection modules 200 as the SPARK_OUT signal. When the Fuel Select signal is high, which indicates that the operator wishes to run the engine 101 using both gasoline and CNG, the output of the and gate 305 will be determined by the Spark MUX CTL signal output from the microprocessor 132a. When the Spark MUX CTL signal is high, the SPARK_OUT signal will correspond to a signal determined and output by the microprocessor 132a; when the Spark MUX CTL signal is low, the SPARK_OUT signal will correspond to the SPARK_IN signal.

Optionally, and although not shown in FIGS. 3(a) and (b), diagnostic circuitry including hardware only or both hardware and software may be used to analyze the various signals transmitted to and from the PCM 134. To acquire the signals, the ECU 132 can tap the CAN bus to access the signals via the PCM 134 rather than directly measuring the signals by tapping sensor lines themselves. Alternatively, the ECU 132 may acquire some of the signals by tapping the CAN bus, and acquire other signals by tapping sensor lines.

Figure 5A:
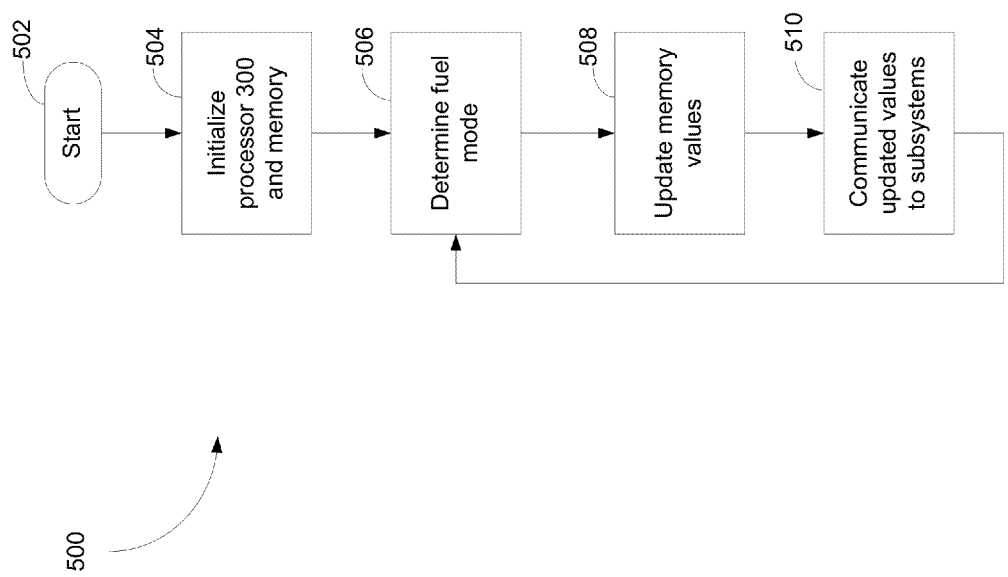
FIGS. 5(a) and 6 are flowcharts illustrating a method for powering the Otto cycle engine using gasoline and the compressed natural gas.

Referring now to FIG. 5(a), there is shown an exemplary method 500 that the microprocessor 132a continuously performs while active. At block 502, the microprocessor 132a activates. At block 504, the microprocessor 132a initializes its memory (in the depicted embodiment, contained within the microprocessor 132a and not shown; in an alternative embodiment, distinct from the microprocessor 132a) in preparation for collecting and storing data from various sensors located throughout the system 100. At block 506, the microprocessor 132a determines in which fuel mode the system 100 is operating. In the present exemplary embodiment, there are two possible fuel modes that are selected in accordance with the method depicted in FIG. 5(b) that is discussed in further detail, below. The two fuel modes are "gasoline only" and "multiple fuels". When the fuel mode is gasoline only, the engine 101 is operated exclusively using gasoline. When the fuel mode is multiple fuels, the engine 101 is operated using either exclusively gasoline, exclusively CNG, or a combination of gasoline and CNG, depending on current operating conditions and as discussed in more detail below in respect of FIGS. 7(a) and (b). In the present embodiment, the Fuel Selection signal is high when the fuel mode is set to multiple fuels, and is low when the fuel mode is gasoline only.

At block 508, the microprocessor 132a updates the memory with various pieces of data obtained using the system 100's sensors; this data includes information on current MAP, engine speed in RPM, and fuel pressure (both gasoline and CNG). At block 510, the microprocessor 132a sends the sensor data to other systems in the motor vehicle for their use (e.g.: operator displays and diagnostics systems). Following block 510, the microprocessor 132a loops back to block 506.

Figure 5B:
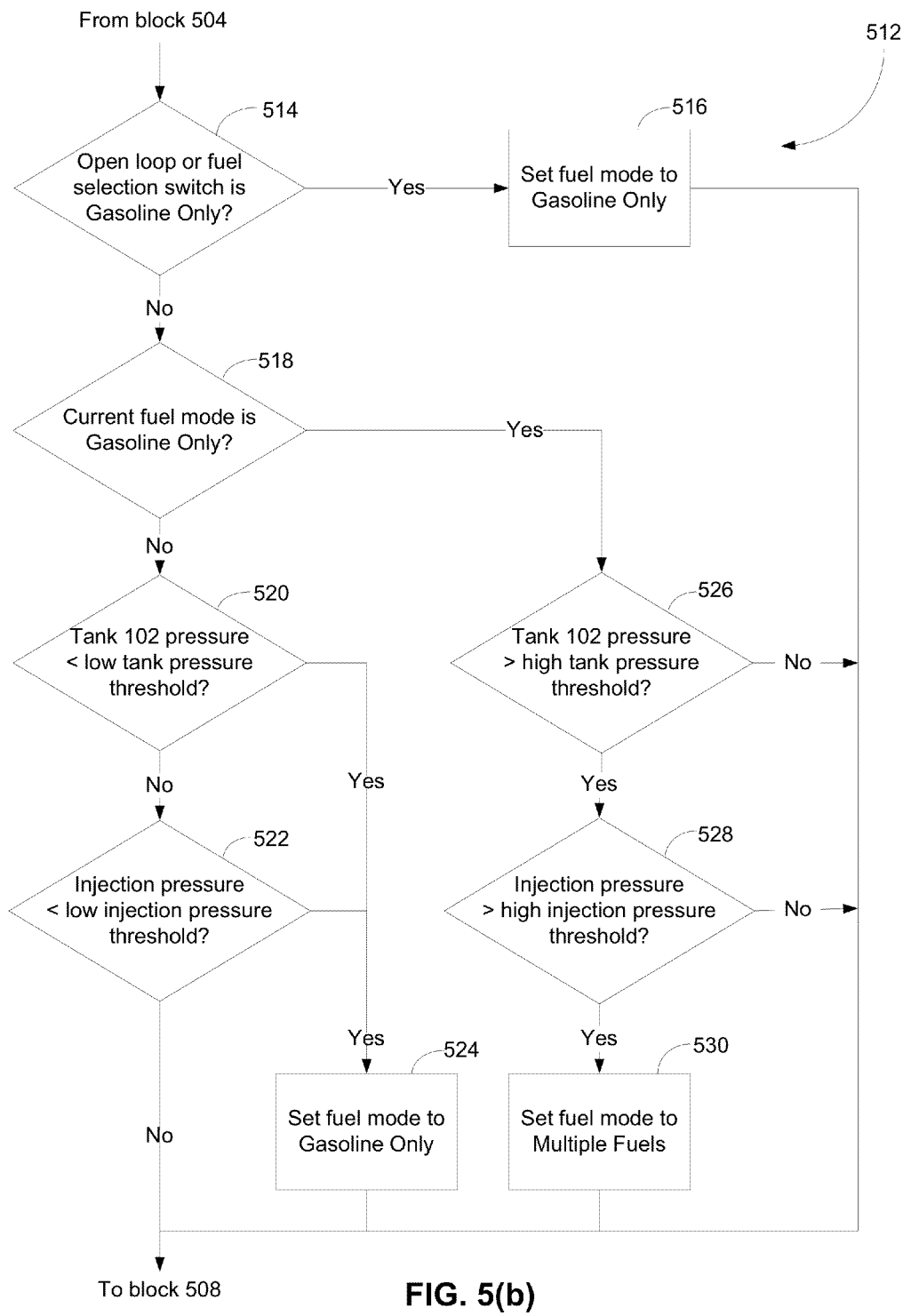
FIG. 5(b) is a flowchart illustrating a method for determining fuel mode that can be used while performing the method of FIG. 5(a), according to another embodiment.

Referring now to FIG. 5(b), there is shown an exemplary method 512 for selecting the fuel mode. At block 514, the microprocessor 132a first determines whether the fuel selection switch is set to gasoline only or whether the system 100 is operating in open loop mode. If either of these conditions is true, the microprocessor 132a proceeds to block 516 and sets the fuel mode to gasoline only. If the fuel selection switch is set to gasoline only, the operator has manually overridden any decision making process the microprocessor 132a would otherwise perform, and the microprocessor 132a responds by forcing the engine 101 to operate exclusively on gasoline. If the system 100 is operating in open loop mode, it is not receiving any feedback from the oxygen sensors 130. Typically this occurs after the engine 101 has started and the oxygen sensors 130 have not yet warmed up enough to provide readings. Without such information accurately measuring the air-fuel ratio is difficult, and the microprocessor 132a therefore operates the engine 101 exclusively using gasoline until the oxygen sensors 130 have warmed up enough to return readings, which transitions the system 100 from open loop to closed loop mode, that allow the air-fuel ratio to be accurately measured.

If the system 100 is in closed loop mode and the fuel selection switch is set to allow multiple fuels to be used, the microprocessor 132a proceeds to block 518 and determines whether the system 100 is in gasoline only mode or multiple fuels mode. The distinction is relevant because in the depicted embodiment the microprocessor 132a is configured to transition from multiples fuels mode to gasoline only mode if pressure in the tank 102 that holds the CNG falls below a low tank pressure threshold or the injection pressure measured at the alternative fuel injectors 124 falls below a low injection pressure threshold. However, the microprocessor 132a is configured not to transition to multiple fuels mode from gasoline only mode unless the pressure in the tank 102 exceeds a high tank pressure threshold and the injection pressure exceeds a high injection pressure threshold, where the high pressure thresholds are greater than the low pressure thresholds. In the present embodiment, the low tank pressure threshold is 150 psig, the low injection pressure threshold is 15 psig, the high tank pressure threshold is 200 psig, and the high injection pressure threshold is 16 psig, although in alternative embodiments different thresholds can be used.

Accordingly, in the method 512 of FIG. 5(*b*), if the current fuel mode is gasoline only, the microprocessor 132a proceeds to blocks 526 and 528 where it determines whether the pressure in the tank 102 exceeds the high tank pressure threshold (block 526) and whether the injection pressure exceeds the high injection pressure threshold (block 528). If both of these criteria are not satisfied, the microprocessor 132a proceeds to update memory values at block 508 and leaves the fuel mode as gasoline only. If both of these criteria are satisfied, the microprocessor 132a changes the fuel mode to multiple fuels (block 530), and then proceeds to block 508.

Similarly, if the current fuel mode is multiple fuels, the microprocessor 132a proceeds to blocks 520 and 522 where it determines whether the pressure in the tank 102 is less than the low tank pressure threshold (block 520) and whether the injection pressure is less than the low injection pressure threshold (block 522). If either of these criteria is satisfied, the microprocessor 132a changes the fuel mode to gasoline only (block 524) and then proceeds to update memory values at block 508. If neither of these conditions is satisfied, the microprocessor 132a leaves the fuel mode unchanged as multiple fuels and then proceeds to block 508.

In alternative embodiments (not depicted), readings for other engine parameters may influence the microprocessor 132a's decision of what fuels to use. Additionally, in a further alternative embodiment (not depicted), there may be a third fuel mode in which the microprocessor 132a instructs the engine 101 to burn either the gasoline or the CNG, but not both simultaneously.

Figure 4:
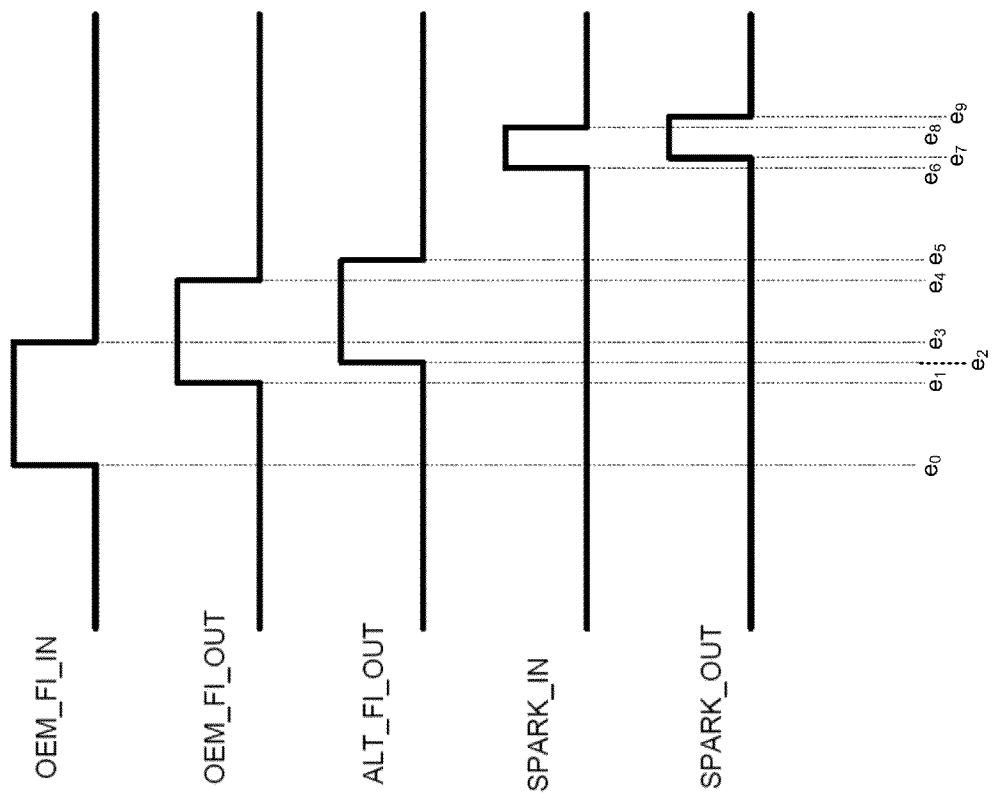
FIG. 4 shows traces of exemplary signals that are input to and output from the electronic control unit of FIG. 2.

Referring now to FIG. 4, there is shown a timing diagram of the OEM_FI_IN, OEM_FI_OUT, ALT_FI_OUT, and SPARK_IN signals on an exemplary cycle of the engine 101 when it is burning CNG as the alternative fuel. As discussed in further detail below, when CNG is used as the alternative fuel the SPARK_OUT and SPARK_IN signals are typically identical to each other. The SPARK_OUT signal waveform depicted in FIG. 4 is slightly delayed relative to SPARK_IN, and typically represents an alternative embodiment in which an alternative fuel other than CNG is used that combusts more quickly than gasoline, such as hydrogen.

Figure 6:
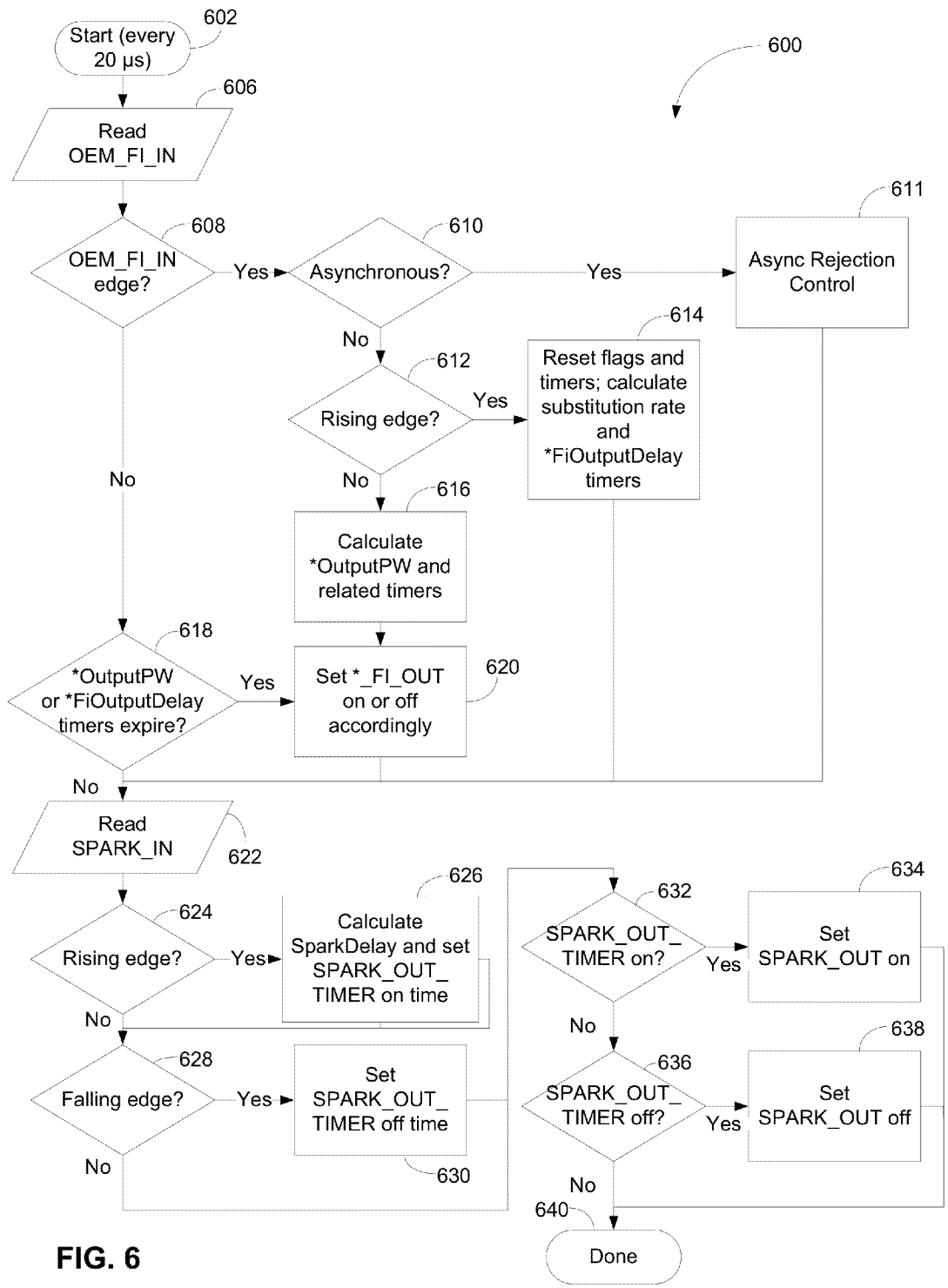

FIG. 6 is an exemplary method 600 run by the microprocessor 132a for every cylinder of the engine 101 in response to a periodic interrupt request to determine the OEM_FI_OUT, ALT_FI_OUT, and SPARK_OUT signals from the OEM_FI_IN signal, the SPARK_IN signal, and various other pieces of sensor data. The following describes exemplary performance of the method 600 in response to the waveforms depicted in the timing diagram of FIG. 4.

At block 602, the interrupt occurs. In the depicted embodiment the interrupt occurs every 20 μs; however, in alternative embodiments (not depicted), the interrupt may have a different period or may not occur periodically at all. At block 606 the microprocessor 132a reads the OEM_FI_IN signal and at block 608 detects whether the OEM_FI_IN signal is transitioning from low to high or high to low; i.e., the microprocessor 132a detects whether there is an edge of the OEM_FI_IN signal. If yes, the microprocessor 132a proceeds to block 610 to determine whether the edge is of an asynchronous pulse sent from the PCM 134; an asynchronous pulse is one that does not represent the main burst of gasoline (hereinafter referred to as the "stock quantity" of gasoline) to be injected into the manifold. In the depicted exemplary embodiment, pulses are considered asynchronous if they are delivered outside of a certain window of time. For example, in the depicted exemplary embodiment the engine 101 has eight cylinders 1-8 and the firing order of its cylinders is 1-8-7-2-6-5-4-3. For any given cycle through the firing order, a pulse for a particular cylinder is considered asynchronous if it is sent after the particular cylinder fired in the immediately preceding firing cycle and before the cylinder that is two ahead of the particular cylinder in the firing cycle has fired in the given cycle. For example, if the particular cylinder being considered in the present firing cycle is cylinder number 2, any OEM_FI_IN pulse intended for cylinder number 2 will be considered asynchronous if it is sent after cylinder number 2 fired on the previous firing cycle and before cylinder number 8 fires on the present firing cycle. More generally, the asynchronous pulse can be any pulse sent to the cylinder during a period starting when the cylinder fired during the immediately preceding firing cycle of the engine 101 and continuing until a certain number of other cylinders in the engine 101 has fired at most once each (in the foregoing example for cylinder number 2, six other cylinders). The other cylinders fire at most once each because each cylinder fires once per firing cycle of the engine 101, and accordingly a synchronous pulse (one which represents the stock quantity of gasoline) occurs once per firing cycle. Alternatively or additionally, a timer that is set following firing of a particular cylinder may be used to determine when subsequent pulses intended for that cylinder are asynchronous (e.g.: all pulses received until expiry of the timer may be considered asynchronous).

If the edge is not of an asynchronous pulse, it is of a signal intended to cause the gas injectors 126 to inject the stock quantity of gasoline into the manifold for subsequent intake into the cylinder and combustion. If the signal is asynchronous, the microprocessor 132a proceeds to block 611 and performs asynchronous pulse rejection control.

At block 611, if the engine 101 is in gasoline only mode the microprocessor 132a allows the OEM_FI_IN signal to be sent to the gasoline injectors 126 by setting the OEM_

FI_OUT signal to follow the OEM_FI_IN signal. However, if the engine 101 is set to operate in multiple fuels mode, the microprocessor 132a first determines whether the gasoline injectors 126 are currently injecting gasoline or if gasoline injection is pending. By "pending", it is meant that the microprocessor 132a has detected a rising edge at block 612 but has not yet driven the OEM_FI_OUT signal high at block 620, as discussed in more detail below; i.e., the PCM 134 has previously sent a synchronous pulse that will cause, but has not yet caused, the gasoline injectors 126 to inject gasoline. If the gasoline injectors 126 are currently injecting gasoline or if gasoline injection is pending, then the microprocessor 132a blocks the asynchronous pulse and prevents it from affecting the OEM_FI_OUT signal. However, if the gasoline injectors 126 are not currently injecting gasoline and if gasoline injection isn't pending, then the microprocessor 132a sets the OEM_FI_OUT signal to follow the OEM_FI_IN signal.

If the signal is not asynchronous, the microprocessor 132a proceeds to block 612 where it detects whether the edge of the OEM_FI_IN signal is a rising edge. If yes, the microprocessor 132a proceeds to block 614 to determine what the substitution rate ($S_n$) is. The substitution rate refers to the portion of the stock quantity of gasoline that is to be substituted with the alternative fuel, which in the depicted exemplary embodiment is CNG. A remaining portion of the stock quantity of gasoline that is not substituted with CNG then becomes the quantity of gasoline that is delivered to the cylinder. Referring to FIG. 6, the microprocessor 132a first moves from block 612 to 614 at event $e_0$.

At block 614, prior to determining the substitution rate the microprocessor 132a resets its various timers and flags, particulars of which are given below, as the rising edge of the OEM_FI_IN signal represents a new engine cycle independent for the purposes of the method 600 from values generated during previous cycles. To determine the substitution rate, the microprocessor 132a first determines whether any substitution of gasoline by CNG at all is to be performed. If no, then the substitution rate is zero. In the present embodiment, the substitution rate will be non-zero if the fuel mode is set to multiple fuels and if one or both of 1) the manifold air pressure of the engine 101 is below or between a low multiple fuel pressure threshold and a high multiple fuel pressure threshold, and 2) the engine speed is below or between a low multiple fuel speed threshold and a high multiple fuel speed threshold. In the present embodiment the low multiple fuel pressure threshold is 70 kPa and the high multiple fuel pressure threshold is 90 kPa, while the low multiple fuel speed threshold is 4,000 rpm and the high multiple fuel speed threshold is 5,000 rpm, although these values may be different in alternative embodiments. For example, in an alternative embodiment (not depicted) the low multiple fuel pressure threshold may be 0 kPa. If these criteria are not satisfied, then the substitution rate in the present embodiment is zero and the engine 101 is powered solely using gasoline. When powered solely using gasoline, the OEM_FI_OUT signal is set to be identical to the OEM_FI_IN signal and to be output without any delay, while the ALT_FI_OUT signal is set to stay low. In the present embodiment, the microprocessor 132a implements this functionality using timers. One timer, OemFiOutputDelay, represents a gasoline injection delay between the rising edge of the OEM_FI_IN signal and the rising edge of the OEM_FI_OUT signal. When the substitution rate is zero, OemFiOutputDelay is set to zero as the OEM_FI_OUT signal tracks the OEM_FI_IN signal. A second timer, AltFiOutputDelay, represents an alternative fuel injection delay between the rising edge of the OEM_FI_IN signal and the rising edge of the ALT_FI_OUT signal. When the substitution rate is zero, AltFiOutputDelay is set to infinity as the ALT_FI_OUT signal does not change.

When the microprocessor 132a determines that the substitution rate will be nonzero, the microprocessor 132a then proceeds to determine a particular value for the substitution rate, according to Equation (1):

$$S_n = \text{MAPRate} \cdot \text{SpeedTrimOut} \cdot \text{MaxSubstitutionRate} \quad (1)$$

where $$\text{MAPRate} = 1 + \frac{\text{MinMAP}}{\text{MaxMAP} - \text{MinMAP}} - \frac{\text{MAP}}{\text{MaxMAP} - \text{MinMAP}} \quad (2)$$

$$\text{SpeedTrimOut} = 1 + \frac{\text{MinRPM}}{\text{MaxRPM} - \text{MinRPM}} - \frac{\text{RPM}}{\text{MaxRPM} - \text{MinRPM}} \quad (3)$$

$$\text{MaxSubstitutionRate} = 100\% \quad (4)$$

Figure 7A:
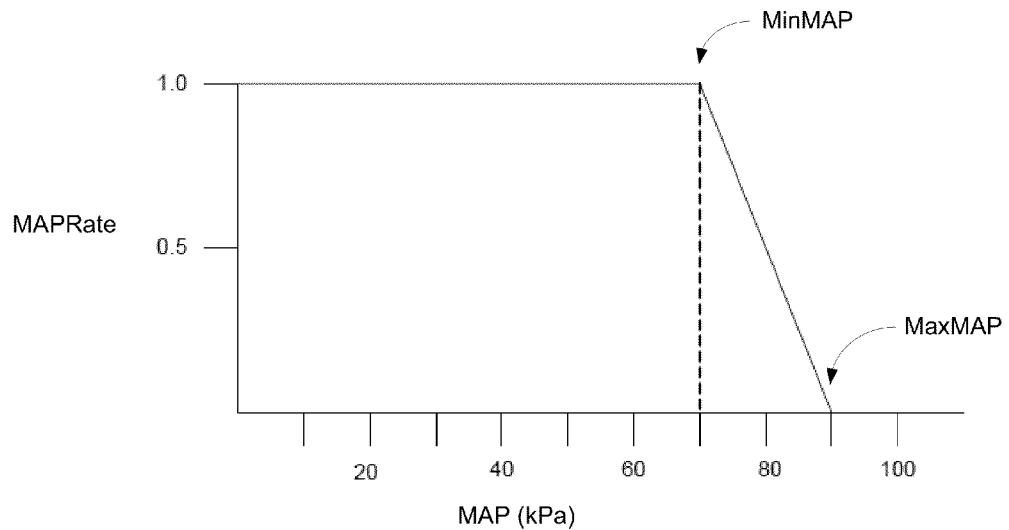
FIGS. 7(a) and 7(b) are graphs illustrating how MAP rate and speed trim, which are used as inputs to determine substitution rate of compressed natural gas for gasoline in one embodiment, respectively vary with manifold air pressure and engine speed, according to the system of FIG. 1.
Figure 7B:
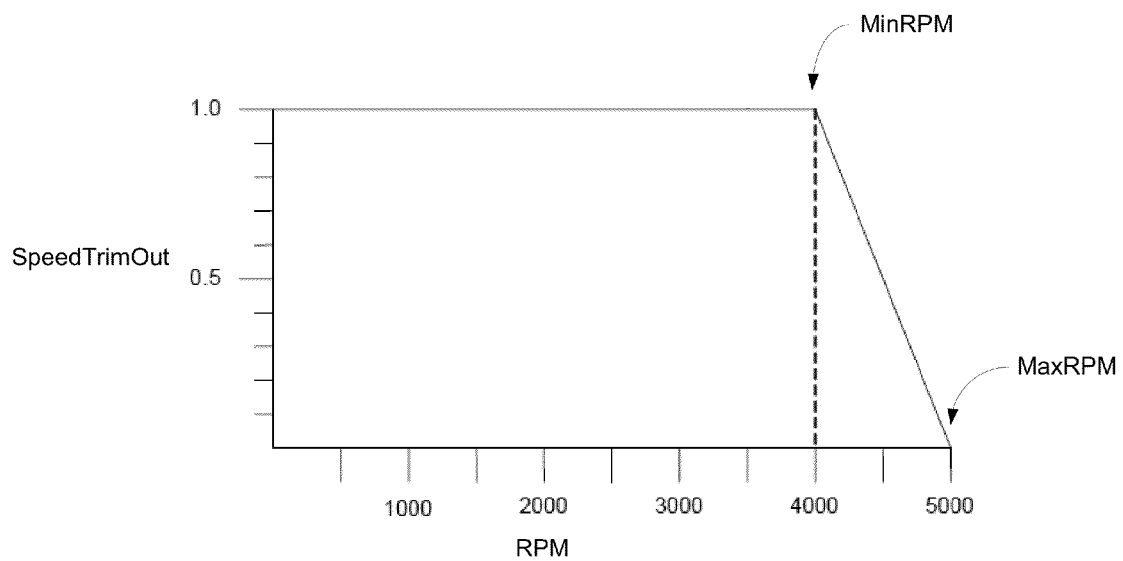

In Equation (2), MAP represents manifold pressure; an exemplary value for MaxMAP is 90 kPa; and an exemplary value for MinMAP is 70 kPa. In Equation (3), RPM represents engine speed (rotations per minute) of the engine 101; an exemplary value for MaxRPM is 5,000 RPM; and an exemplary value for MinRPM is 4,000 RPM. FIG. 7(a) is a graph of MAPRate vs. MAP using the foregoing exemplary values of MaxMAP and MinMAP, while FIG. 7(b) is a graph of SpeedTrimOut vs. RPM using the foregoing exemplary values of MaxRPM and MinRPM. As evident from FIGS. 7(a) and (b), when MAP equals or exceeds MaxMAP or when RPM equals or exceeds MaxRPM, the microprocessor 132a commands the engine 101 to operate exclusively using gasoline even if the fuel mode is set to multiple fuels. As MAP corresponds to engine load, MinMAP corresponds to a low load threshold and MaxMAP corresponds to a high load threshold. As RPM corresponds to engine speed, MinRPM corresponds to a low speed threshold, while MaxRPM corresponds to a high speed threshold.

Following determination of the substitution rate, the microprocessor 132a sets the OemFiOutputDelay and AltFiOutputDelay timers. If the substitution rate is 100%, the microprocessor 132a sets the OemFiOutputDelay timer to be infinite as the OEM_FI_OUT signal does not go high, and sets the AltFiOutputDelay timer to zero as the alternative fuel injectors 124 can immediately begin injecting CNG into the manifold. While in the present embodiment the maximum substitution rate is 100%, in alternative embodiments the maximum substitution rate may be different value, such as 85%.

If the substitution rate is greater than 0% and less than 100%, then the microprocessor 132a sets the timers as follows:

$$\text{OEMFiOutputDelay timer} = 3 + S_n \cdot 20 \quad (5)$$

$$\text{AltFiOutputDelay timer} = 3 + (1 - S_n) \cdot 20 \quad (6)$$

Delaying the triggering of OEM_FI_OUT and ALT_FI_OUT signals by the amounts of time specified by Equations (5) and (6) allow the microprocessor 132a to receive sufficient information from the OEM_FI_IN pulse to properly determine the pulse width for OEM_FI_OUT and ALT_FI_OUT, as discussed in respect of Equations (7) and (8), below.

After the microprocessor 132a sets the OemFiOutputDelay and AltFiOutputDelay timers at block 614 at event $e_0$, the microprocessor 132a does not alter any of the ECU 132's outputs or set any timers and proceeds through blocks 622, 624, 628, 632, 636 and 640, where the method 600 ends. As the method 600 is repeatedly executed every 20 µs, the microprocessor 132a proceeds through blocks 602, 606, 608, 618, 622, 624, 628, 632, 636 and 640 without changing any of the ECU 132's outputs or setting any timers until the OemFiOutputDelay timer expires. On the first execution of the method 600 following expiry of the OemFiOutputDelay timer, the microprocessor 132a will move through blocks 602, 606, 608, 618, but will then proceed to block 620 instead of to block 622 and will drive the OEM_FI_OUT signal high, resulting in event $e_1$. Similarly, and in the depicted embodiment several interrupts after event $e_1$, the microprocessor 132a will also eventually drive the ALT_FI_OUT signal high resulting in event $e_2$.

After several additional interrupts, the OEM_FI_IN signal transitions from high to low at event $e_3$. On the subsequent execution of the method 600, the microprocessor 132a proceeds though blocks 602, 606, 608, 610 and 612, and as the microprocessor 132a detects OEM_FI_IN's rising edge then moves to block 616 where it determines the pulse widths of the OEM_FI_OUT and ALT_FI_OUT signals according to Equations (7) and (8):

$$\text{OEMOutputPW} = (1 - S_n)(\text{OEMInputPW} - \text{OEMInjOffset}) + \text{OEMInjOffset} \quad (7)$$

$$\text{AltOutputPW} = \frac{S_n \cdot Z(\text{OEMInjSlope}(\text{OEMInputPW} - \text{OEMInjOffset}))}{\text{AltInjSlope}} + \text{AltInjOffset} \quad (8)$$

where OEMInputPW is the measured pulse width of the OEM_FI_IN signal, and where AltInjSlope and AltInjOffset depend on the equipment used to manufacture the system 100 and the type of fuel used. In an embodiment in which the alternative fuel injectors 124 are Keihin™ DM4-2 fuel injectors, suitable values for AltInjSlope and AltInjOffset are as follows:
AltInjSlope=2.414226
AltInjOffset=1.047293
Z in Equation (8) is defined as follows:

$$z = \frac{M_{altfuel} \cdot AF_{gasoline}}{M_a(1 + AF_{mAltfuel})} \quad (9)$$

where
$M_{altfuel}$ is molar mass of alternative fuel
$M_a$ is molar mass of air
$AF_{gasoline}$ is the mass air-fuel ratio of gasoline
$AF_{mAltfuel}$ is the molar air-fuel ratio of the alternative fuel
OEMInjSlope and OEMInjOffset are determined from the following equations:

$$\text{OEMInjSlope} = p \cdot \Delta P^2 + q \cdot \Delta P + r \quad (10)$$

$$\text{OEMInjOffset} = s \cdot \Delta P^2 + t \cdot \Delta P + u \quad (11)$$

where constants "p" through "u" depend on the properties of the OEM injector and ΔP is the pressure differential across the injector determined from measured MAP and gasoline fuel injection pressure (i.e.: the pressure resulting from the gasoline fuel pump); for the stock gasoline injectors 126 that ship with the 2008 GMC™ Truck 1500 4WD Yukon™ Hybrid, suitable values for "p" through "u" are as follows:

TABLE 2

Coefficient Values Used to Calculate OEMInj Slope and OEMInjOffset

| Coefficient | Value |
| --- | --- |
| p | −0.000170 |
| q | 0.0529 |
| r | 1.2160 |
| s | 0.0000147 |
| t | 0.000255 |
| u | 0.0707 |

When the microprocessor 132a determines OEMOutputPW and AltOutputPW, it also performs several failsafe checks to ensure that the gasoline and alternative fuel injectors 126, 124 perform as intended. For example, the microprocessor 132a compares AltOutputPW to a minimum duration for which the alternative fuel injector 124 can activate. If AltOutputPW is less than this minimum duration and therefore corresponds to less than the minimum amount of CNG that the alternative fuel injector 124 can inject, the microprocessor 132a sets the substitution rate to 0%. That is, the microprocessor 132a sets OEMOutputPW to be the same as the pulse width of OEM_FI_IN, and sets AltOutputPW to zero.

If AltOutputPW is long enough to fall within the alternative fuel injector 124's capabilities, then the processor performs an analogous check on OEMOutputPW. If OEMOutputPW corresponds to less than the minimum amount of gasoline that the gasoline injector 126 will be able to inject, then the gasoline injector 126 will not be able to inject the desired amount of gasoline. The microprocessor 132a therefore recalculates AltOutputPW assuming a 100% substitution rate, and sets OEMOutputPW to zero.

Finally, if either OEM_FI_OUT or ALT_FI_OUT are to go high but haven't yet as the timers measuring OemFiOutputDelay and AltFiOutputDelay have not yet expired, the microprocessor 132a nonetheless causes one or both of OEM_FI_OUT and ALT_FI_OUT to go high (i.e.: the microprocessor 132a forces one or both of events $e_1$ and $e_2$ to occur). This is done because by this time in the cycle, the microprocessor 132a has a value for OEMInputPW, which is sufficient information to determine the pulse widths for OEM_FI_OUT and ALT_FI_OUT.

Following determination of AltOutputPW and OEMOutputPW, the microprocessor 132a sets an AltOutputPW timer to have a duration of AltOutputPW and an OEMOutputPW timer to have a duration of OEMOutputPW, and respectively uses these timers to determine for how long to keep ALT_FI_OUT and OEM_FI_OUT high. Immediately after setting these timers, the microprocessor 132a proceeds to block 620 where, if the AltOutputPW and OEMOutputPW timers are greater than zero and ALT_FI_OUT and OEM_FI_OUT are not high already, ALT_FI_OUT and OEM_FI_OUT are turned on. In the timing diagram shown in FIG. 4, however, as both ALT_FI_OUT and OEM_FI_OUT have already been turned on by the time the AltOutputPW and OEMOutputPW timers have been set, the microprocessor 132a passes through block 620 without altering the state of any output signals and then proceeds through blocks 622, 624, 628, 632, 636 and 640 where the method 600 ends.

Until one of the AltOutputPW and OEMOutputPW timers expire, each time the microprocessor 132a performs the method 600 it simply progresses through blocks 602, 606, 608, 618, 622, 624, 628, 632, 636 and 640 without changing any output signals. In the embodiment shown in FIG. 4, following expiry of the OEMOutputPW timer the microprocessor 132a performs blocks 602, 606, 608 and 618, and following block 618 proceeds to block 620 where it shuts off the OEM_FI_OUT signal; this results in the falling edge shown as event $e_4$ in FIG. 4. After performing blocks 620, the microprocessor proceeds via blocks 622, 624, 628, 632 and 636 without altering any output signals to block 640 where the method 600 ends. When the AltOutputPW timer expires, the microprocessor 132a similarly shuts off the ALT_FI_OUT signal, which is reflected by the falling edge shown as event $e_5$.

In order to determine the proper duration of the ALT_FI_OUT and OEM_FI_OUT pulses, the microprocessor 132a predetermines the air-fuel ratio of the gasoline and CNG mix such that it can burn at stoichiometry, as the engine 101 is configured to do when it burns only gasoline. That is, in the retrofit embodiment the microprocessor 132a assumes that burning the quantity of gasoline specified by the OEM_FI_IN pulse would result in the engine 101 operating at stoichiometry, and prior to generating the OEM_FI_OUT and ALT_FI_OUT signals the microprocessor 132a attempts to replicate stoichiometric combustion by predetermining an appropriate air-fuel ratio to use with the CNG and gasoline mixture and by pulsing the OEM_FI_OUT and ALT_FI_OUT signals accordingly. Maintaining this air-fuel ratio beneficially facilitates proper operation of the vehicle's catalytic converter and $CO_2$ as the engine 101's primary waste product. In an alternative embodiment (not depicted), instead of stoichiometric combustion the air-fuel ratio may be predetermined such that the air-fuel ratio is rich or lean.

Until event $e_6$, each time the microprocessor 132a performs the method 600 it simply progresses through blocks 602, 606, 608, 618, 622, 624, 628, 632, 636 and 640 without changing any output signals or setting any timers. However, at event $e_6$, which is the rising edge of the SPARK_IN signal, the microprocessor 132a proceeds through blocks 602, 606, 608, and 618, to block 622 where it reads the SPARK_IN signal, then to block 624 where it detects the rising edge of the SPARK_N signal, and then to block 626 where it determines the length of a SparkDelay timer. The SparkDelay timer is set as follows:

$$\text{SparkDelay timer} = j \cdot k \cdot \text{Enginespeed} - 1 \cdot \text{MAP} + m \cdot S_n \quad (12)$$

The SparkDelay timer is used because some alternative fuels combust more quickly than gasoline, and the SparkDelay timer delays combustion of the alternative fuel to better correspond with the combustion of the gasoline. Synchronizing combustion of the two fuels increases pressure within the cylinder, which can increase combustion efficiency, decrease harmful emissions, and prevent undesirable behaviour such as engine knock. In the depicted embodiment when CNG is the alternative fuel, SparkDelay is zero so the coefficients "j" through "m" are all zero. SparkDelay is zero when CNG is the alternative fuel because CNG combusts more slowly than gasoline, so typically combustion is not delayed. In alternative embodiments in which CNG and gasoline are mixed, SparkDelay may nonetheless be non-zero depending on the proportion of gasoline present in the fuel mixture and on driving conditions; for example, during high engine load driving conditions (e.g.: periods of high acceleration), combustion may nonetheless be delayed notwithstanding that the fuel mixture being burned contains some CNG. In alternative embodiments in which the alternative fuel combusts more quickly than gasoline, j through m may be nonzero and may be determined empirically. For example, when the alternative fuel is hydrogen, the SparkDelay timer is greater than zero. FIG. 4 shows SPARK_OUT when SparkDelay is non-zero.

At block 626 the microprocessor 132a also sets a SPARK_OUT_TIMER on time. SPARK_OUT_TIMER determines when the SPARK_OUT signal will be high. The microprocessor 132a sets SPARK_OUT_TIMER to initially go high SparkDelay after the rising edge of the SPARK_IN signal. The microprocessor 132a continues to loop through the method 600 without changing any signal outputs until SPARK_OUT_TIMER turns on, which is detected at block 632. When SPARK_OUT_TIMER goes on, the microprocessor 132a proceeds to block 634 and accordingly turns SPARK_OUT on before proceeding to the end of the method 600 at block 640. Turning SPARK_OUT on corresponds to event $e_7$ in FIG. 4.

After event $e_7$, the microprocessor 132a loops through the method 600 without changing any signal outputs until event $e_8$, which is the falling edge of the SPARK_IN signal. The microprocessor 132a detects this falling edge at block 628 and proceeds to block 630 where it sets the SPARK_OUT_TIMER to go off SparkDelay after the SPARK_IN signal goes off. The microprocessor 132a then loops through the method 600 without changing any signal outputs until the SPARK_OUT_TIMER goes off, which the microprocessor 132a detects at block 636. After detecting the SPARK_OUT_TIMER shutting off at block 636, the microprocessor 132a proceeds to block 638 where it shuts the SPARK_OUT signal off (event $e_9$), before proceeding to block 640 where the method 600 ends.

The microprocessor 132a then waits for the PCM 134 to begin another cycle by turning OEM_FI_IN high at event $e_0$. The microprocessor 132a detects this at block 612, and then proceeds to block 614 where all the aforementioned timers and variables are reset, the substitution rate is again determined, and events $e_1$ through $e_9$ repeat.

In the foregoing embodiments, the 2008 GMC™ Truck 1500 4WD Yukon™ Hybrid is also a hybrid electric vehicle, so the vehicle is powered using both fossil fuels and electricity. However, in an alternative embodiment (not depicted), the vehicle may be powered without use of electricity. Often, motor vehicles powered by both fuel engines and electric motors transition between the two while the vehicle is in operation. In order for the transition between the engine 101 and the electric motor to be smooth and unnoticeable to the operator, the torque that the engine 101 outputs when powered using both gasoline and CNG should be identical to the torque output when the engine 101 is powered only using gasoline.

Road tests were performed using the 2008 GMC™ Yukon™ Hybrid Sports Utility Vehicle (1500 4WD) described above. Table 3 summarizes the results of such testing at an average ambient temperature of −7° C.:

TABLE 3

Results of Testing

| Driving Conditions | Fuel Efficiency when Fuel Selection Switch set to Gasoline Only (L/100 km) | Fuel Efficiency when Fuel Selection Switch set to Multiple Fuels (L/100 km) |
|---|---|---|
| City | 23.3 | 20.1 |
| Highway | 9.8 | 13.0 |
| Combined | 17.2 | 16.1 |

As the 2008 GMC™ Yukon™ is a hybrid electric vehicle, the fuel efficiency results in Table 3 in the "Gasoline Only" column are obtained when only gasoline and electricity are used to power the vehicle, while the results in the "Multiple Fuels" column are obtained when gasoline, CNG and electricity are used to power the vehicle. The results indicate a 6% improvement in combined-cycle fuel economy.

Figure 9:
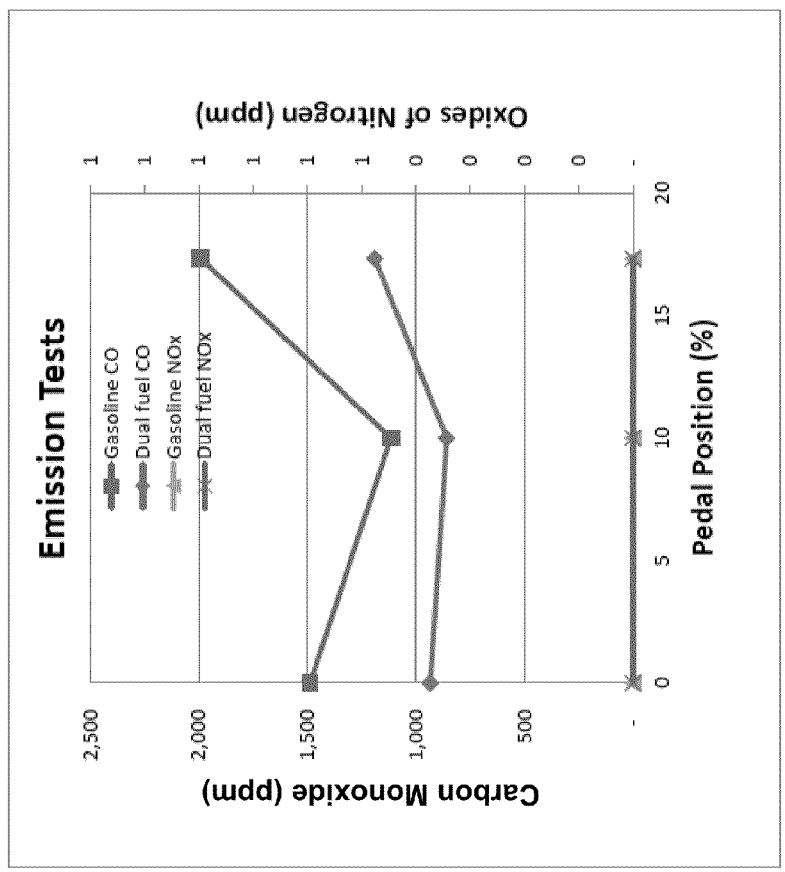
FIG. 9 is a graph illustrating how emissions are reduced when both compressed natural gas and gasoline, as opposed to gasoline alone, are used to power the Otto cycle engine.

Emissions test results of the 2008 GMC™ Yukon™ Hybrid SUV are shown in FIG. 9, which show CO and NOx output by the 2008 GMC™ Yukon™ Hybrid SUV when it is running exclusively on gasoline and when it is running on both gasoline and CNG. Although the NOx sensor used was insufficiently sensitive enough to generate useful data, the CO measurements taken show a substantial decline in CO emissions when the vehicle is operating using both gasoline and CNG as opposed to exclusively gasoline. In particular, at 0% pedal position emissions are lower when operating using two fuels by 37% (1,488 ppm to 934 ppm); at 10% pedal position emissions are lower when operating using two fuels by 23% (1,115 ppm to 859 ppm); and at 20% pedal position emissions are lower when operating using two fuels by 40% (1,992 ppm to 1,190 ppm).

Exemplary OEM Embodiment

Figure 8:
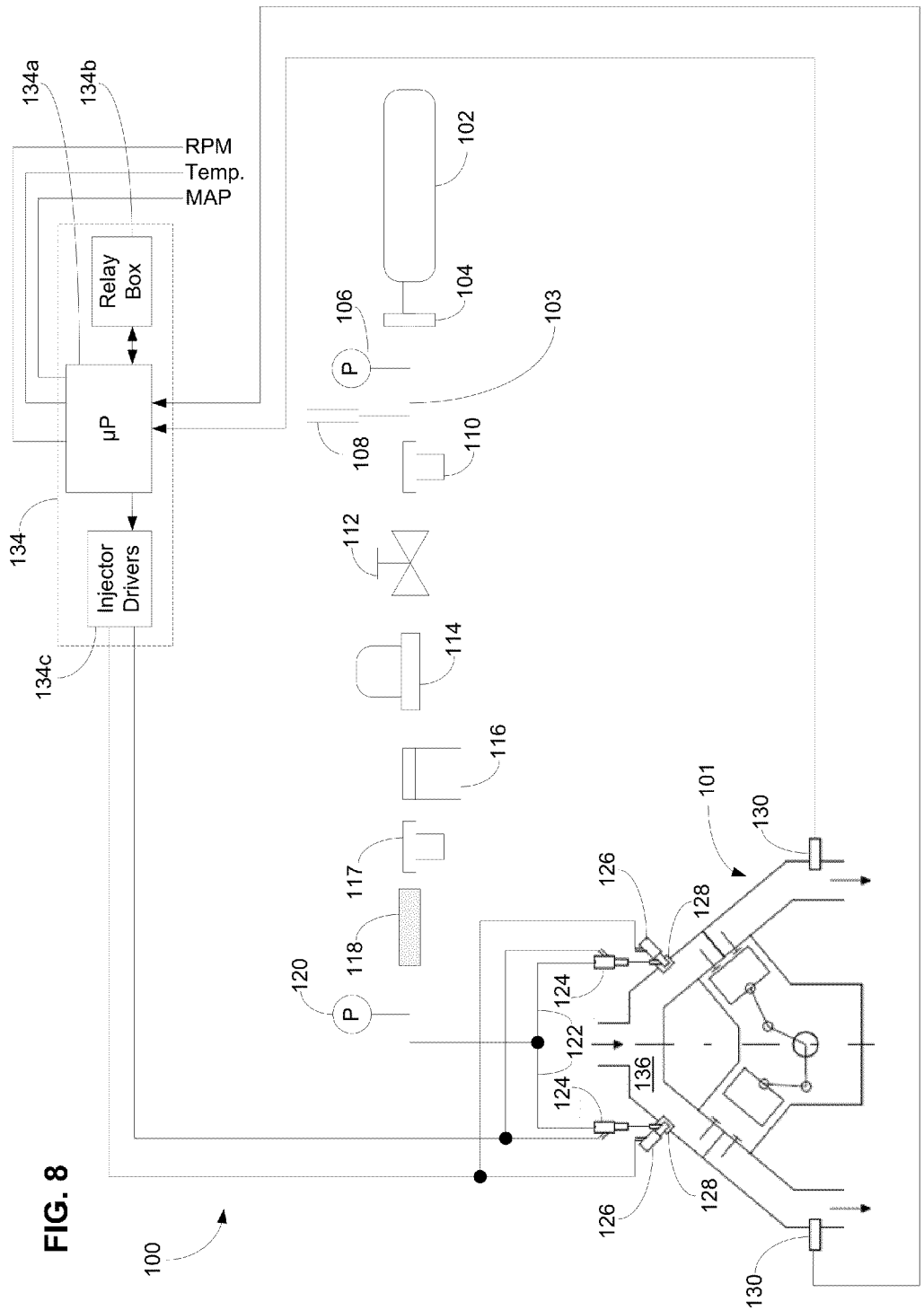
FIG. 8 is a schematic of an OEM system for powering the Otto cycle engine using gasoline and the compressed natural gas, according to another embodiment.

The foregoing embodiments describe the use of the PCM 134 and the ECU 132. This configuration is useful when converting a gasoline-only vehicle to a vehicle that runs on both gasoline and CNG (or another alternative fuel). However, in an alternative embodiment such as that depicted in FIG. 8 the motor vehicle uses the PCM 134 that is configured to generate and output the proper signals to the injectors 124, 126 and the other components of the system 100 without intercepting signals. The embodiment of the system 100 shown in FIG. 8 is substantially similar to the system 100 shown in FIG. 1, except that the ECU 132 and PCM 134 assembly has been replaced simply with the PCM 134. The PCM 134 in FIG. 8 is shown as embodying the functionality of injector drivers 134c, microprocessor 134a, and relay box 134b. The PCM 134 shown in FIG. 8 has substantially similar functionality to the combination of the ECU 132 and PCM 134 depicted in FIG. 1.

In order to implement the PCM 134 shown in FIG. 8, the microprocessor 134a may first determine what OEM_FI_IN and SPARK_IN signals it would use if it were powering the engine 101 solely using gasoline and then generate the OEM_FI_OUT, ALT_FI_OUT and SPARK_OUT signals using the method discussed in respect of FIGS. 5(a), (b) and 6, above. In an alternative embodiment (not depicted), the PCM 134 may simply generate OEM_FI_OUT, ALT_FI_OUT, and SPARK_OUT signals directly based on predetermined (e.g.: manufacturer specified) knowledge of what the desired air-fuel ratio is to ensure proper vehicle operation, and without first generating or modifying OEM_FI_IN or SPARK_IN signals.

Beneficially over bi-fuel vehicles, the system 100 described above is able to simultaneously combust gasoline and the alternative fuel. This allows the engine 101 to have greater power output when burning the alternative fuel than bi-fuel vehicles, since the engine 101 of the foregoing embodiments can burn a mixed blend of gasoline and the alternative fuel as opposed to bi-fuel vehicles, which are forced to burn entirely the alternative fuel when they are not burning gasoline. The system 100 described above is also beneficial over flex-fuel vehicles, in that varying blends of gasoline and the alternative fuel can be burned in respond to dynamic driving conditions. As evidenced by the test results graphed in FIG. 9, the system 100 is also beneficial over conventional gasoline-only engines in that the use of CNG as a fuel reduces CO emissions.

In the retrofit embodiment discussed above, the ECU 132 is solely responsible for actuating the gasoline injectors 126, regardless of what the substitution rate is. The signal that actuates the gasoline injectors 126 is sent by the ECU 132, which takes into consideration the OEM_FI_IN signal from the PCM 134 when determining how to actuate the gasoline injectors 126. This is in contrast to an embodiment in which a relay system is used to transfer actuation control of the gasoline injectors 126 to the ECU 132 when the substitution rate is non-zero, and that otherwise transfers actuation control of the gasoline injectors 126 to the PCM 134 when no gasoline is being substituted with CNG. The solution employed by the retrofit embodiment above is more robust than employing a relay system, since elimination of the relay system also eliminates the likelihood that the relay system will fail, and is also more flexible than employing a relay system as it allows the ECU 132 to manipulate the signals sent to the gasoline injectors 126 even when the substitution rate is zero, if so desired.

The foregoing exemplary methods may be stored on a non-transitory computer readable medium for execution by a any suitable controller, such as a processor, microcontroller, programmable logic controller, field programmable gate array, or can be implemented in hardware using, for example, an application-specific integrated circuit. For example, in alternative embodiments (not depicted) the ECU 132 or PCM 134 may include a programmable logic controller having one or both of an internal and an external memory that either individually or collectively encoded thereon statements and instructions to cause the ECU 132 or PCM 134 to execute any of the foregoing exemplary methods. Exemplary computer readable media include disc-based media such as CD-ROMs and DVDs, magnetic media such as hard drives and other forms of magnetic disk storage, semiconductor based media such as flash media, random access memory, and read only memory.

For the sake of convenience, the exemplary embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

FIGS. 5(a), 5(b), and 6 are flowcharts of exemplary methods. Some of the blocks illustrated in the flowchart may be performed in an order other than that which is described. Also, it should be appreciated that not all of the blocks described in the flow chart are required to be performed, that additional blocks may be added, and that some of the illustrated blocks may be substituted with other blocks.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for powering an Otto-cycle engine using gasoline and compressed natural gas (CNG), the method comprising:
    (a) determining a quantity of the gasoline and a quantity of the CNG to deliver to a cylinder of the engine during an engine cycle such that combustion within the cylinder occurs at a predetermined air-fuel ratio, wherein determining the quantity of the gasoline and the quantity of the CNG comprises:
- (i) determining a stock quantity of the gasoline to deliver to the cylinder such that combustion occurs within the cylinder at the predetermined air-fuel ratio when the engine is powered solely using the gasoline;
- (ii) determining a portion of the stock quantity of the gasoline to substitute with the CNG, wherein the remaining stock quantity of gasoline following substitution is the quantity of the gasoline to deliver to the cylinder; and
- (iii) determining the quantity of the CNG to deliver to the cylinder from the portion of the stock quantity of gasoline to substitute with the CNG such that combustion of the gasoline and the CNG within the cylinder occurs at the predetermined air-fuel ratio;

(b) delivering the quantity of the gasoline into the cylinder via a gasoline injector and delivering the quantity of the CNG into the cylinder via an alternative fuel injector such that the gasoline and the CNG combust during the same combustion event; and (c) combusting the gasoline and the CNG within the cylinder during the same combustion event.

2. A method as claimed in claim 1 wherein the predetermined air-fuel ratio is selected such that combustion within the cylinder occurs at stoichiometry.

3. A method as claimed in claim 1, wherein determining the stock quantity of the gasoline comprises intercepting an injection signal, sent to the gasoline injector from a powertrain control module that is configured to power the engine solely using the gasoline, instructing the gasoline injector to deliver the stock quantity of the gasoline into the cylinder.

4. A method as claimed in claim 3 wherein intercepting the injection signal comprises simulating operation of the gasoline injector such that the powertrain control module is unaware that the injection signal has been intercepted.

5. A method as claimed in claim 3 wherein the injection signal is intercepted by an electronic control unit communicatively coupled to the powertrain control module, and wherein the gasoline injector is solely actuated by the electronic control unit regardless of whether any of the stock quantity of gasoline is substituted with the CNG.

6. A method as claimed in claim 3 wherein intercepting the injection signal comprises:
- (a) determining whether the injection signal comprises an asynchronous pulse, wherein the asynchronous pulse comprises any pulse sent to the cylinder during a period starting when the cylinder fired during an immediately preceding firing cycle of the engine and continuing until a certain number of other cylinders in the engine has fired at most once each; and
- (b) when the injection signal comprises the asynchronous pulse:
  - (i) determining whether the gasoline injector is currently injecting gasoline or whether the powertrain control module has previously sent a synchronous pulse that will cause, but has not yet caused, the gasoline injector to inject gasoline; and
  - (ii) when the gasoline injector is not currently injecting gasoline and the powertrain control module has not previously sent a synchronous pulse that will cause, but has not yet caused, the gasoline injector to inject gasoline, sending the asynchronous pulse to the gasoline injector.

7. A method as claimed in claim 6 further comprising, when the injection signal comprises the asynchronous pulse, blocking the asynchronous pulse when the gasoline injector is currently injecting gasoline or when the powertrain control module has previously sent a synchronous pulse that will cause, but has not yet caused, the gasoline injector to inject gasoline.

8. A method as claimed in claim 1 wherein the quantity of the CNG varies with engine load.

9. A method as claimed in claim 1 wherein determining the quantity of the gasoline and the quantity of the CNG comprises:
- (a) determining whether engine load is less than a low load threshold, and using none of the gasoline to fuel the engine when the engine load is less than the low load threshold; and
- (b) determining whether engine load exceeds a high load threshold, and using none of the CNG to fuel the engine when the engine load exceeds the high load threshold.

10. A method as claimed in claim 1 wherein the quantity of the CNG varies with engine speed.

11. A method as claimed in claim 1 wherein determining the quantity of the gasoline and the quantity of the CNG comprises:
- (a) determining whether engine speed is less than a low speed threshold, and using none of the gasoline to fuel the engine when the engine speed is less than the low speed threshold; and
- (b) determining whether engine speed exceeds a high speed threshold, and using none of the CNG to fuel the engine when the engine speed exceeds the high load threshold.

12. A method as claimed in claim 1 further comprising determining whether pressure in a tank containing the CNG exceeds a high tank pressure threshold and whether pressure at the alternative fuel injector exceeds a high injection pressure threshold, and delivering none of the CNG to the cylinder unless the pressure in the tank and the pressure at the alternative fuel injector exceed the high tank pressure threshold and the high injection pressure threshold, respectively.

13. A method as claimed in claim 12 further comprises determining whether the pressure in the tank containing the CNG is below a low tank pressure threshold and whether the pressure at the alternative fuel injector is below a low injection pressure threshold, and delivering exclusively the gasoline to the cylinder when the pressure in the tank and the pressure at the alternative fuel injector are both below the low tank pressure threshold and the low injection pressure threshold, respectively.

14. A method as claimed in claim 3 wherein the gasoline is delivered to the cylinder a gasoline injection delay after interception of the injection signal, and the CNG is delivered to the cylinder an alternative fuel injection delay after interception of the injection signal.

15. A method as claimed in claim 1 further comprising determining whether the quantity of the gasoline to be delivered is less than a minimum amount of gasoline that the gasoline injector is able to inject, and if so fuelling the engine exclusively with the CNG.

16. A method as claimed in claim 1 further comprising determining whether the quantity of the CNG to be injected is less than a minimum amount of alternative fuel that the alternative fuel injector is able to inject, and if so fuelling the engine exclusively with the gasoline.

17. A method as claimed in claim 1 wherein the combustion event that combusts both the CNG and the gasoline occurs later than a combustion event that is used to combust exclusively gasoline.

18. A method as claimed in claim 1 wherein the quantity of the gasoline and the quantity of the CNG are each determined using a pressure differential across the gasoline injector comprising a difference between measured manifold air pressure and gasoline fuel injection pressure.

19. A system for powering an Otto-cycle engine using gasoline and compressed natural gas (CNG), the system comprising:
(a) a processor;
(b) a memory, communicatively coupled to the processor, and having encoded thereon statements and instructions to cause the processor to execute a method as comprising:
 (i) determining a quantity of the gasoline and a quantity of the CNG to deliver to a cylinder of the engine during an engine cycle such that combustion within the cylinder occurs at a predetermined air-fuel ratio, wherein determining the quantity of the gasoline and the quantity of the CNG comprises:
  (1) determining a stock quantity of the gasoline to deliver to the cylinder such that combustion occurs within the cylinder at the predetermined air-fuel ratio when the engine is powered solely using the gasoline;
  (2) determining a portion of the stock quantity of the gasoline to substitute with the CNG, wherein the remaining stock quantity of gasoline following substitution is the quantity of the gasoline to deliver to the cylinder; and
  (3) determining the quantity of the CNG to deliver to the cylinder from the portion of the stock quantity of gasoline to substitute with the CNG such that combustion of the gasoline and the CNG within the cylinder occurs at the predetermined air-fuel ratio;
 (ii) delivering the quantity of the gasoline into the cylinder via a gasoline injector and delivering the quantity of the CNG into the cylinder via an alternative fuel injector such that the gasoline and the CNG combust during the same combustion event; and
 (iii) combusting the gasoline and the CNG within the cylinder during the same combustion event.

20. A system as claimed in claim 19 further comprising:
(a) a powertrain control module configured to power the engine solely using the gasoline; and
(b) an electronic control unit comprising the processor and communicatively coupled to the engine and to the powertrain control module.

21. A non-transitory computer readable medium having encoded thereon statements and instructions to cause a processor to execute a method comprising:
(a) determining a quantity of the gasoline and a quantity of the CNG to deliver to a cylinder of the engine during an engine cycle such that combustion within the cylinder occurs at a predetermined air-fuel ratio, wherein determining the quantity of the gasoline and the quantity of the CNG comprises:
 (i) determining a stock quantity of the gasoline to deliver to the cylinder such that combustion occurs within the cylinder at the predetermined air-fuel ratio when the engine is powered solely using the gasoline;
 (ii) determining a portion of the stock quantity of the gasoline to substitute with the CNG, wherein the remaining stock quantity of gasoline following substitution is the quantity of the gasoline to deliver to the cylinder; and
 (iii) determining the quantity of the CNG to deliver to the cylinder from the portion of the stock quantity of gasoline to substitute with the CNG such that combustion of the gasoline and the CNG within the cylinder occurs at the predetermined air-fuel ratio;
(b) delivering the quantity of the gasoline into the cylinder via a gasoline injector and delivering the quantity of the CNG into the cylinder via an alternative fuel injector such that the gasoline and the CNG combust during the same combustion event; and
(c) combusting the gasoline and the CNG within the cylinder during the same combustion event.

22. A method as claimed in claim 1 wherein the substitution rate is non-increasing as engine speed increases from minimum to maximum speed.

23. A method as claimed in claim 1 wherein the substitution rate is non-increasing as engine load increases from minimum to maximum load.

* * * * *